US012675201B2

(12) United States Patent
Zhang et al.

(10) Patent No.: US 12,675,201 B2
(45) Date of Patent: Jul. 7, 2026

(54) DISPLAY DEVICE

(71) Applicants: K-Tronics (Suzhou) Technology Co., Ltd., Suzhou (CN); BOE TECHNOLOGY GROUP CO., LTD., Beijing (CN)

(72) Inventors: Jingjing Zhang, Beijing (CN); Wei Huang, Beijing (CN); Zhaoxi Yu, Beijing (CN); Guangning Hao, Beijing (CN); Shu Zhang, Beijing (CN); Ze Jin, Beijing (CN); Zhongcheng Li, Beijing (CN); Wenbo Dong, Beijing (CN)

(73) Assignees: K-TRONICS (SUZHOU) TECHNOLOGY CO., LTD., Suzhou (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 19/081,038

(22) Filed: Mar. 17, 2025

(65) Prior Publication Data

US 2025/0216997 A1      Jul. 3, 2025

Related U.S. Application Data

(63) Continuation-in-part of application No. 18/681,535, filed as application No. PCT/CN2022/096428 on May 31, 2022, now Pat. No. 12,265,681.

(51) Int. Cl.
| | |
|---|---|
| *G06F 3/00* | (2006.01) |
| *G06F 3/041* | (2006.01) |
| *G06F 3/046* | (2006.01) |

(52) U.S. Cl.
CPC ............ *G06F 3/046* (2013.01); *G06F 3/0412* (2013.01)

(58) Field of Classification Search
CPC ....... G06F 3/0412; G06F 3/0421; G06F 3/046
See application file for complete search history.

(56) References Cited

U.S. PATENT DOCUMENTS

| | | | | |
|---|---|---|---|---|
| 2005/0157500 A1* | 7/2005 | Chen | .................... | G02B 6/0085 |
| | | | | 362/800 |
| 2013/0016500 A1* | 1/2013 | Tress | .................... | F21V 21/005 |
| | | | | 362/133 |

FOREIGN PATENT DOCUMENTS

| | | |
|---|---|---|
| CN | 116088711 A | 5/2023 |

OTHER PUBLICATIONS

First Office Action of CN application No. 202280001592.1 dated Jul. 21, 2025.

* cited by examiner

*Primary Examiner* — Insa Sadio
(74) *Attorney, Agent, or Firm* — Calfee, Halter & Griswold LLP

(57) ABSTRACT

The present disclosure provides a display device. The display device includes a transparent cover plate and a frame assembly. The frame assembly includes an outer frame and a light filtering strip. The light filtering strip includes a light filtering part and a buffer part, and the light filtering part presses at a front side edge of the transparent cover plate. The outer frame includes a front frame wall and a rear frame wall. An inner side end of the front frame wall presses on a front side surface of the light filtering part. The rear frame wall includes a resisting part that resists against an outer side of the buffer part. The buffer part is located between the resisting part and an outer side surface of the transparent cover plate.

22 Claims, 9 Drawing Sheets

DISPLAY DEVICE

CROSS REFERENCE

The present application is a continuation-in-part application of the U.S. patent application Ser. No. 18/681,535, which is based upon International Application No. PCT/CN2022/096428, filed on May 31, 2022, which claims priority to Chinese Patent Application No. 202111304644.6, filed on Nov. 5, 2021 and entitled "DISPLAY DEVICE", the entire contents of which are incorporated herein by reference.

TECHNICAL FIELD

The present disclosure relates to the field of display technology, and in particular, to a display device.

BACKGROUND

An infrared touch whiteboard determines a writing position by capturing on/off of the signal of an infrared tube. The infrared tube includes an infrared emitter and an infrared receiver arranged on opposite sides of a display screen. The infrared light emitted from the infrared emitter is refracted by a light filtering strip, so that the emitted light is parallel to the display screen, thereby achieving an optical touch.

It should be noted that the information disclosed in the above section is only intended to enhance the understanding of the background of the present disclosure, and thus can include information that does not constitute the prior art already known to those skilled in the art.

SUMMARY

According to one aspect of the present disclosure, a display device is provided. The display device includes a transparent cover plate, a frame assembly, and an infrared touch assembly, wherein the frame assembly includes an outer frame and a light filtering strip, the light filtering strip includes a light filtering part and a buffer part, wherein the light filtering part presses at a front side edge of the transparent cover plate; the outer frame includes a front frame wall and a rear frame wall, wherein an inner side end of the front frame wall presses on a front side surface of the light filtering part; and the rear frame wall includes a resisting part that resists against an outer side of the buffer part, wherein the buffer part is located between the resisting part and an outer side surface of transparent cover plate.

In some embodiments of the present disclosure, the display device further includes an infrared touch assembly, wherein the infrared touch assembly is accommodated in a wiring cavity formed inside the frame assembly, and the wiring cavity comprises a second opening configured for the infrared touch assembly to emit or receive touch light signals.

In some embodiments of the present disclosure, the buffer part includes a first insertion part, the resisting part includes a first mounting chamber, the first mounting chamber includes a first opening on a side of the first mounting chamber facing towards the buffer part, and the first insertion part is embedded in the first mounting chamber via the first opening; and wherein an opening direction of the first opening is the same as an opening direction of the second opening.

In some embodiments of the present disclosure, the first mounting chamber includes: a first wall; and a second wall located on a side of the first wall away from the second opening, wherein a first gap is formed between the second wall and the first insertion part; and wherein the buffer part further includes a water bar, wherein the water bar covers the first gap.

In some embodiments of the present disclosure, a second gap is formed between the first wall and the first insertion part, and the buffer part blocks and seals the second gap.

In some embodiments of the present disclosure, the resisting part further includes a water storage tank, and the water storage tank is communicated with the first mounting chamber.

In some embodiments of the present disclosure, the water storage tank is provided in at least one of following forms: the water storage tank is located on a side of the first mounting chamber away from the first opening, or the water storage tank is located on a side of the first mounting chamber away from the second opening.

In some embodiments of the present disclosure, a size of at least a portion of an internal space of the first mounting chamber in a target direction is larger than a size of the first opening in the target direction, and the target direction is orthogonal to the opening direction of the first opening.

In some embodiments of the present disclosure, the frame assembly further includes: a second mounting chamber, wherein the first mounting chamber and the second mounting chamber are respectively located on opposite sides of the second opening, the second mounting chamber includes a third opening, and an opening direction of the third opening intersects with the opening direction of the first opening; and wherein the light filtering strip further includes a second insertion part, wherein the second insertion part is embedded in the second mounting chamber via the third opening.

In some embodiments of the present disclosure, the light filtering part includes a first surface, a second surface, and a third surface, the first surface is adjacent to the second surface, and the third surface is opposite to the first surface and adjacent to the second surface; wherein the buffer part further includes a connection part, and the first insertion part is connected to the light filtering part via the connection part; and wherein the second insertion part is connected to the first surface, and the connection part is connected to one of the second surface, the third surface, and a connection between the second surface and the third surface.

In some embodiments of the present disclosure, the frame assembly further includes a supporting member, the supporting member includes a first supporting vertical wall, a supporting transverse wall, and a second supporting vertical wall, the first supporting vertical wall is connected to a front side end of the supporting transverse wall and extends towards an inner side of the transparent cover plate, the first supporting vertical wall is connected to a rear side edge of the transparent cover plate, the second supporting vertical wall is connected to a rear side end of the supporting transverse wall and extends towards an outer side of the transparent cover plate, and the second supporting vertical wall is connected to the outer frame, and wherein a third gap is formed between the first supporting vertical wall, the outer side surface of the transparent cover plate, and the first mounting chamber, and the water bar is located within the third gap.

In some embodiments of the present disclosure, a fourth gap is formed between an inner side surface of the rear frame wall and an outer side surface of the supporting transverse wall, a fifth gap is formed between a rear side surface of the rear frame wall and a front side surface of the second supporting vertical wall, and the slope of the water bar can guide water entering the frame assembly to the fourth gap and discharge the water from the frame assembly via the fifth gap.

In some embodiments of the present disclosure, the first supporting vertical wall is connected to the rear side edge of the transparent cover plate through double-sided adhesive, and a width of an adhesive surface between the double-sided adhesive and the transparent cover plate is 1.1-2.0 times a width of a contact surface between the light filtering part and the transparent cover plate.

In some embodiments of the present disclosure, a portion of a chamber wall or the whole chamber wall of the first mounting chamber is coated with a water absorbing film.

In some embodiments of the present disclosure, the buffer part includes a bearing section and a guiding section, a width of the bearing section is not smaller than half of a thickness of the transparent cover plate, and the guiding section is connected to a rear side end of the bearing section and tilts towards the outer side of the buffer part.

In some embodiments of the present disclosure, the bearing section resists against the resisting part on all outer side surface of the bearing section.

In some embodiments of the present disclosure, an angle between the guiding section and a side surface of the transparent cover plate ranges between 5° and 30°.

In some embodiments of the present disclosure, a size of the buffer part in a front-rear direction is 0.9-1.3 times a thickness of the transparent cover plate.

In some embodiments of the present disclosure, the front frame wall is provided with a securing protrusion protruding towards a rear side of the front frame wall, and a thickness of a rear side end of the securing protrusion is larger than a thickness of a front side end of the securing protrusion; and wherein the front side surface of the light filtering part is provided with a securing groove that matches with the securing protrusion, and the securing protrusion is inserted into the securing groove.

In some embodiments of the present disclosure, a body portion of the rear frame wall is provided on a rear side of the transparent cover plate.

It should be understood that the general description in the above and the detailed description in the following are only illustrative and explanatory, and do not limit the present disclosure.

BRIEF DESCRIPTION OF THE DRAWINGS

The drawings, which are incorporated in and constitute a part of this specification, illustrate embodiments consistent with the present disclosure and serve together with the specification to explain principles of the present disclosure. It is apparent that the drawings in the following description are only some embodiments of the present disclosure, and for those of ordinary skill in the art, other drawings can also be obtained from these drawings without creative efforts.

EXPLANATIONS OF REFERENCE NUMERALS

Figure 1:
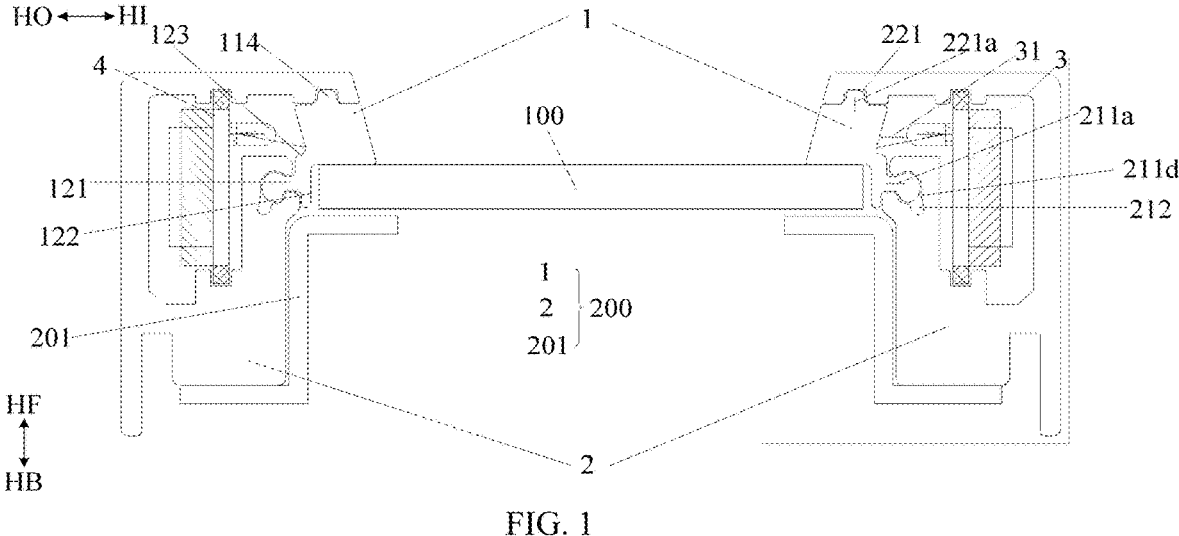
FIG. 1 is a schematic diagram of a structure of a display device according to embodiments of the present disclosure.

1. light filtering strip; 11. light filtering part; 111. first surface; 112. second surface; 113. third surface; 114. second insertion part; 12. buffer part; 121. first insertion part; 122. water bar; 123. connection part; 2. outer frame; 21. rear frame wall; 22. front frame wall; 23. outer frame body; 211. resisting part; 211*a*. first opening; 211*b*. first wall; 211*c*. second wall; 211*d*. first mounting chamber; 211*e*. water storage tank; 212. second protruding platform; 213. second groove; 221. second mounting chamber; 221*a*. third opening; 222. first protruding platform; 223. first groove; 3. wiring cavity; 31. second opening; 4. infrared touch assembly; 41. infrared emitter; 42. infrared receiver; 43. circuit board; 100. transparent cover plate; 200. frame assembly; 201. supporting member; 2011. first supporting vertical wall; 2012. second supporting vertical wall; 2013. supporting transverse wall; 2014. bumper block; 231. first gap;

D32. connection wall; D321. first connection wall; D322. second connection wall; F21. transferring section; F22. bearing section; F23. guiding section; F24. limit protrusion; D21. securing protrusion; F1G. securing groove; GG. sealing strip; HF. front side; HB. rear side; HI. inner side; HO. outer side.

DETAILED DESCRIPTION

Example embodiments will now be described more fully with reference to the drawings Example embodiments, however, can be embodied in a variety of forms and should not be construed as being limited to examples set forth herein. Instead, these embodiments are provided so that the present disclosure will be thorough and complete, and will fully convey concepts of the example embodiments to those skilled in the art. The same reference numerals in the drawings represent the same or similar structures, and thus their detailed descriptions will be omitted. In addition, the drawings are only illustrative and are not necessarily drawn to scale.

Terms "one", "a", "the", "said", and "at least one" are used to indicate the existence of one or more elements/components/etc. Terms "include" and "has" are used to indicate open inclusion and refer to the existence of additional elements/components/etc. in addition to the listed ones. Terms "first", "second", and "third" are only used as reference numerals and are not intended to limit the quantity of objects.

Figure 2:
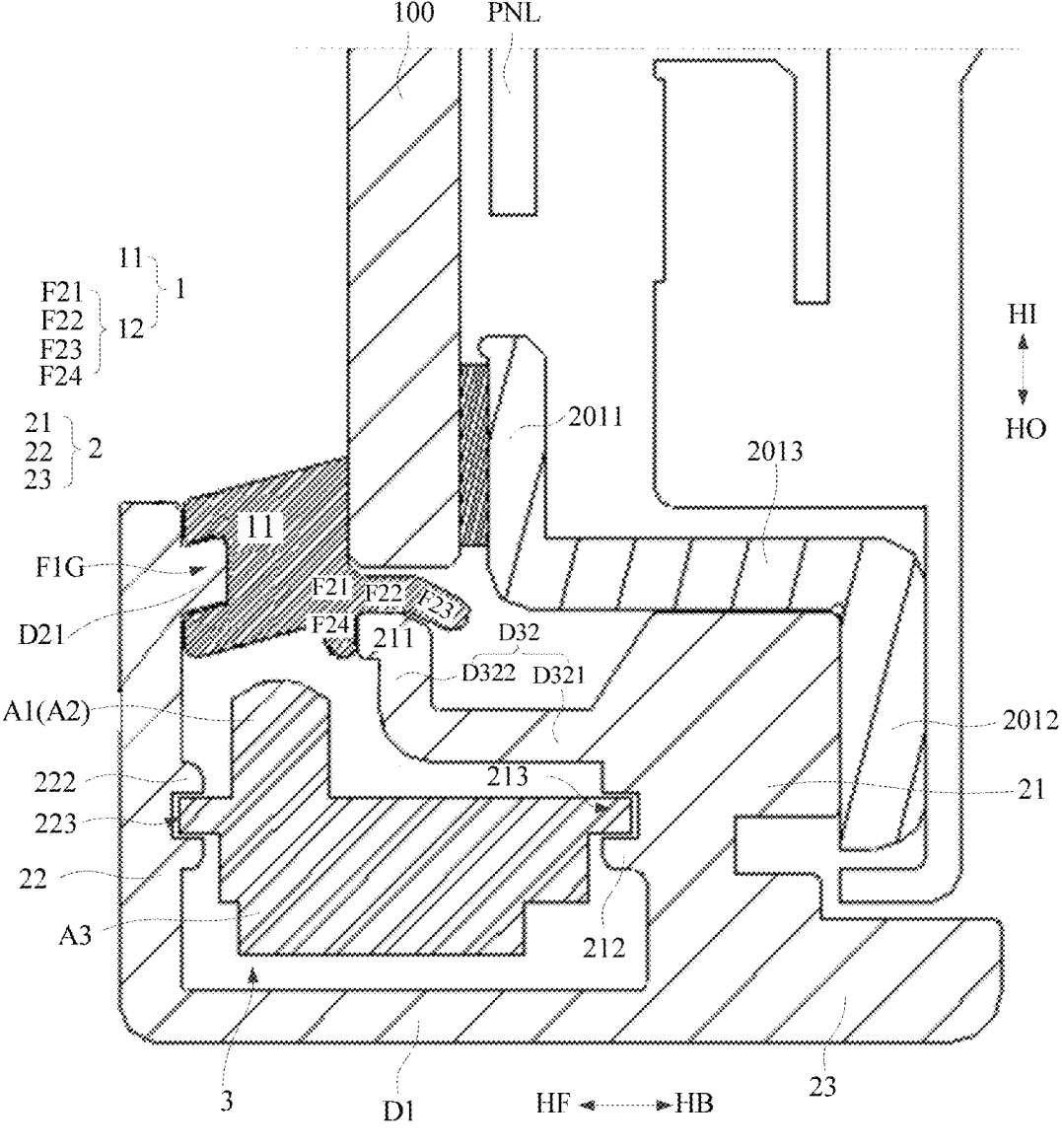
FIGS. 2 to 15 are schematic diagrams of a local structure of a display device according to embodiments of the present disclosure.

The present disclosure provides a display device that can perform infrared touch. The display device can be an electronic whiteboard, a conference tablet, an interactive display board, or other feasible display devices. Referring to FIG. 1 and FIG. 2, the display device includes a transparent cover plate 100, an infrared touch assembly 4, and a frame assembly 200. In some embodiments, the display device can further include a display panel PNL, and the transparent cover plate 100 is arranged in front of the display panel PNL to protect the display panel PNL. The frame assembly 200 is arranged around the display device to provide a border frame. The infrared touch assembly 4 is arranged in the frame assembly 200 and forms a touch surface in front of the transparent cover plate 100. The frame assembly 200 includes a light filtering strip 1. The light filtering strip 1 can block the visible light and transmit the infrared light, avoiding the visible light from affecting the infrared touch.

Referring to FIG. 1, in embodiments of the present disclosure, unless otherwise indicated, a side of the display device used for displaying an image is defined as a front side HF, and a side opposite to the front side is defined as a rear side HB. For example, the transparent cover plate 100 is located on a front side of the display panel PNL, and the display panel PNL emits light towards the front side to display the image.

In embodiments of the present disclosure, unless otherwise indicated, a direction away from a center of a display plane is defined as an outer side HO, and a direction close to the center of the display plane is defined as an inner side HI. For example, the frame assembly 200 is located on an outer side of the transparent cover plate 100.

In the related art, the light filtering strip is usually located at an outer edge of the display screen, which causes some of the infrared light emitted by an infrared lamp to be refracted by the light filtering strip and then to be blocked, resulting in a higher touch height of the infrared touch assembly.

Meanwhile, since the light filtering strip is simply fixed between an outer frame of the frame assembly and the transparent cover plate, it is easy for the light filtering strip to detach from the frame assembly and damage the infrared touch device in the infrared touch assembly when the display device tilts.

Embodiments of the present disclosure provide an improved display device. FIG. 2 shows a schematic diagram of an assembled structure of an infrared touch assembly and a frame assembly 200 provided in embodiments of the present disclosure. As shown in FIG. 2, the display device includes a transparent cover plate 100 and a frame assembly 200. The frame assembly 200 includes an outer frame 2 and a light filtering strip 1. The light filtering strip 1 includes a light filtering part 11 and a buffer part 12. As shown in FIG. 2, the light filtering part 11 presses at a front edge of the transparent cover plate 100. The outer frame 2 has a front frame wall 22 and a rear frame wall 21, with an inner side of the front frame wall 22 pressing on a front side surface of the light filtering part 11. The rear frame wall 21 has a resisting part 211 that resists against an outer side of the buffer part 12, and the buffer part 12 is located between the resisting part 211 and an outer side surface of the transparent cover plate 100. The display device further includes an infrared touch assembly 4. The infrared touch assembly 4 is accommodated in a wiring cavity 3 formed inside the frame assembly 200. As shown in FIG. 2, the infrared touch assembly 4 is fixed between the front frame wall 22 and the rear frame wall 21, and is equipped with an infrared emitter or receiver facing the light filtering part 11. The display panel PNL is fixed behind the transparent cover plate 100.

In the display device of the present disclosure, the light filtering strip 1 is directly in contact with and connected to the transparent cover plate 100, and there is no adhesive layer (such as foam double-sided adhesive) or other film layers used for fastening between the two. In this way, the light filtering part 11 can be made closer to a front side surface of the transparent cover plate 100. The infrared rays emitted by the infrared emitter A1 can pass through the light filtering part 11 to enter the infrared receiver A2 in an opposite frame assembly 200. By detecting the obstruction of infrared rays by an external object such as a finger and a stylus, it is possible to locate the external object and achieve a touch operation. Due to the fact that the light filtering part 11 is closer to the front side surface of the transparent cover plate 100, the infrared rays used for touch are closer to the front side surface of the transparent cover plate 100, which can reduce a touch height of the infrared touch and improve the touch experience. In the present disclosure, in order to achieve the fixation of the light filtering strip 1, the front frame wall 22 of the frame assembly 200 can be pressed onto a front side surface of the light filtering part 11, so that the light filtering part 11 can be sandwiched between the transparent cover plate 100 and the front frame wall 22, overcoming the problem of the unstable arrangement of the light filtering strip 1 due to non-adhesion between the light filtering part 11 and the transparent cover plate 100. In the related art, the buffer foam double-sided adhesive needs to be provided between the light filtering part and the transparent cover plate for bonding, so as to achieve the fixation of the light filtering part, which, on the one hand, significantly increases a distance between the infrared rays and the transparent cover plate, causing the touch height to be raised and resulting in poor writing experience. On the other hand, attaching the buffer foam double-sided adhesive requires precise alignment, which makes an installation process more complex and is not conducive to improving an assembly speed.

In some embodiments of the present disclosure, the light filtering strip 1 further has a buffer part 12 located on an outer side of the transparent cover plate 100. The rear frame wall 21 further has a resisting part 211 that resists against an outer side of the buffer part 12.

The buffer part 12 of the light filtering strip 1 is arranged between the resisting part 211 of the frame assembly 200 and the transparent cover plate 100, which prevents direct contact between the resisting part 211 of the frame assembly 200 and the transparent cover plate 100. During the touch operation, the transparent cover plate 100 is easily vibrated when being knocked, however, the transparent cover plate 100 will not directly contact with, collide with, or rub against the outer frame 2 when vibrating, thereby avoiding abnormal noise caused by the contact between the outer frame 2 and the transparent cover plate 100. In the related art, the outer frame is in direct contact with the edge of the transparent cover plate, and the outer frame is made of metal material, therefore, the transparent cover plate rubs against the outer frame when being touched, which produces a noticeable abnormal noise and reduces the user experience.

Therefore, the display device of the present disclosure can not only reduce the touch height, but also reduce or eliminate the abnormal noise during the touch. It can be understood that in the present disclosure, the touch includes that a display device changes a screen in response to a touch action. For example, a display device can track a trajectory of the external object such as a finger, a stylus, etc. through touch and display the trajectory, achieving the effect of writing on the display device.

A further description and explanation of the structure, principle, and effect of the display device of the present disclosure will be provided in the following in conjunction with the drawings.

In the present disclosure, a material of the light filtering strip 1 can be a plastic material, such as PC (polycarbonate), etc. The infrared touch assembly 4 can include an infrared emitting unit and an infrared receiving unit. The infrared emitting unit and the infrared receiving unit are respectively arranged in two opposite outer frames 2. In some embodiments, the infrared emitting unit can include a circuit board A3 and an infrared emitter A1 (such as an infrared lamp bead) fixed on the circuit board A3. The infrared receiving unit includes a circuit board A3 and an infrared receiver A2 (such as an infrared sensor) fixed on the circuit board A3. Among the two outer frames 2 relatively arranged, one outer frame is provided with the infrared emitting unit, and the other is provided with the infrared receiving unit. In some embodiments, the infrared rays emitted by the infrared emitter A1 can pass, after being filtered by the light filtering strip 1, through the front side of the transparent cover plate 100 and through the light filtering strip 1 on the other side, and then be detected by the infrared receiver A2. When an optical path between the infrared emitter A1 and the infrared receiver A2 is obstructed, such as by the stylus or the finger, the infrared receiver A2 cannot detect the infrared rays, and based on which, the controller of the display device can determine a position of the obstruction on the transparent cover plate 100, achieving the positioning of the obstruction.

In some embodiments of the present disclosure, as shown in FIG. 2, an inner side surface and an outer side surface of the light filtering part 11 can be parallel to each other, so as to ensure that the portion of the light filtering part 11 used for filtering the infrared rays has the same thickness (the size along an inner-outer direction).

In some embodiments of the present disclosure, the buffer part 12 includes a bearing section F22, and a width (the size along a front-rear direction) of the bearing section F22 is not smaller than half of a thickness (the size along the front-rear direction) of the transparent cover plate 100. The resisting part 211 at least partially resists against an outer side surface of the bearing section F22. In this way, when the display device is placed vertically, for example, by hanging on a wall or standing upright through a bracket as an electronic whiteboard, the bearing section F22 located below can bear the transparent cover plate 100 and ensure that there is a larger bearing area between the bearing section F22 and the transparent cover plate 100, avoiding the sliding of the transparent cover plate 100 due to a smaller bearing width (the size of the contact surface along a front-rear direction). In some embodiments, a width of the bearing section F22 is not smaller than ¾ of the thickness of the transparent cover plate 100.

In some embodiments of the present disclosure, an inner side surface of the bearing section F22 is parallel to an outer side surface of the transparent cover plate 100.

In some embodiments of the present disclosure, the bearing section F22 resists against the resisting part 211 on all its outer side surface.

In some embodiments of the present disclosure, as shown in FIG. 2, the buffer part 12 can further include a guiding section F23. The guiding section F23 is connected to a rear side end of the bearing section F22 and tilts towards the outer side. In other words, along a direction towards the rear side HB, the guiding sections F23 of the light filtering strips 1 relatively arranged are as a whole in an expanded shape. In this way, when assembling the transparent cover plate 100, the guiding section F23 can guide the transparent cover plate 100 to slide to fit with the light filtering part 11, thereby reducing the difficulty of assembly.

In some embodiments of the present disclosure, an angle between the guiding section F23 and a side surface of the transparent cover plate 100 is between 5° and 30°, which can ensure that the guiding section F23 has a strong guiding effect.

In some embodiments of the present disclosure, the outer side surface of the guiding section F23 at least partially resists against the resisting part 211. In this way, the resisting part 211 can provide support for the guiding section F23, so that the guiding section F23 can maintain its shape to guide the transparent cover plate 100. In some embodiments of the present disclosure, the outer side surface of the guiding section F23 can also be completely non-contact with the resisting part 211, and only when assembling the transparent cover plate 100, the guiding section F23 is bent under the pressure of the transparent cover plate 100 to contact the resisting part 211.

In some embodiments of the present disclosure, the inner side surface of the resisting part 211 is provided with a chamfer that matches with the outer side surface of the guiding section F23, so as to effectively support the guiding section F23.

In some embodiments of the present disclosure, a front side edge of the transparent cover plate 100 is provided with a chamfer. The buffer part 12 further includes a transferring section F21, and the transferring section F21 is parallel to the chamfer at the front side edge of the transparent cover plate 100. A front side end of the transferring section F21 is connected to the light filtering part 11, and a rear end of the transferring section F21 is connected to a front side end of the bearing section F22. In this way, a matching degree between the buffer part 12 and the transparent cover plate 100 can be improved, achieving a better buffering effect.

In some embodiments of the present disclosure, a thickness of the buffer part 12 is not smaller than 1 millimeter. In this way, the light filtering strip 1 as a whole can be made by an extrusion process, avoiding the increase in the extrusion cost due to too small thickness of the buffer part 12.

In some embodiments of the present disclosure, the size of the buffer part 12 in the front-rear direction is 0.9 to 1.3 times the thickness of the transparent cover plate 100, for example, it can be 1.1 to 1.2 times the thickness of the transparent cover plate 100. In this way, it can not only ensure the bearing strength of the buffer part 12 for the transparent cover plate 100, but also avoid the increase in the extrusion cost caused by that the size of the buffer part 12 is too long in the front-rear direction.

In some embodiments of the present disclosure, the front frame wall 22 is provided with a securing protrusion D21 protruding towards the rear side. The front side surface of the light filtering part 11 is provided with a securing groove F1G that matches with the securing protrusion D21. The securing protrusion D21 is inserted into the securing groove F1G. In this way, on the one hand, the bonding strength between the front frame wall 22 and the light filtering strip 1 can be improved, so that the light filtering strip 1 can be better pressed and fixed. On the other hand, during assembly, the light filtering strip 1 can be pre fixed on the outer frame 2, and the transparent cover plate 100 is assembled after that.

In some embodiments of the present disclosure, a thickness (the size along an inner-outer direction) of the rear side end of the securing protrusion D21 is larger than a thickness (the size along an inner-outer direction) of the front side end of the securing protrusion D21. The size of the securing groove F1G matches with the size of the securing protrusion D21, and a height of a groove bottom (the size of the groove bottom of the securing groove F1G in the inner-outer direction) is larger than a height of a groove opening (the size of the groove opening of the securing groove F1G in the inner-outer direction). In this way, when the securing protrusion D21 is inserted into the securing groove F1G, the securing protrusion D21 will not be able to detach from the groove opening of the securing groove F1G, thereby ensuring the bonding reliability and bonding strength between the light filtering strip 1 and the outer frame 2. In some embodiments, the securing protrusion D21 has a trapezoidal shape (such as isosceles trapezoid, right angle trapezoid, etc.) along a cross-section perpendicular to an extension direction of the securing protrusion D21, and a bottom edge of the trapezoid is on the rear side. In some embodiments, the securing protrusion D21 can also have a T-shaped or T-like shaped structure.

In some embodiments of the present disclosure, the buffer part 12 further includes a limit protrusion F24 protruding towards the outer side. The resisting part 211 of the rear frame wall 21 resists against a rear side surface of the limit protrusion F24. In this way, the light filtering strip 1 is matched with both the securing protrusion D21 and the resisting part 211, thereby ensuring the bonding reliability and the bonding strength between the light filtering strip 1 and the outer frame 2.

In some embodiments of the present disclosure, the inner side surface of the securing groove F1G (i.e. the inner side surface of the securing protrusion D21) is parallel to the inner side surface of the light filtering part 11.

In some embodiments of the present disclosure, the inner side surface of the light filtering part 11 is coplanar with the inner side surface of the front frame wall 22. For example, the inner surface of the light filtering part 11 has a certain slope angle, so that two opposite light filtering parts F1 take on a wide opening facing the front side. In some embodiments, in a direction facing the front side, the inner side surface of the light filtering part 11 extends towards the outer side, and correspondingly, the inner side surface of the front frame wall 22 also takes on the same slope angle, and a rear side edge of the inner side surface of the front frame wall 22 is flush with a front side edge of the inner side surface of the light filtering part 11.

In some embodiments of the present disclosure, the rear side edge of the inner side surface of the front frame wall 22 is flush with the front side edge of the inner side surface of the light filtering part 11.

In some embodiments of the present disclosure, an outer side end of a body portion of the rear frame wall 21 is connected to an outer frame body 23, and extends to the inner side. A connection wall D32 is connected to the body portion of the rear frame wall 21, and extends to be connected with the resisting part 211. In this way, the resisting part 211 is connected to the body portion of the rear frame wall 21 as well as the outer frame body 23 through the connection wall D32.

In some embodiments of the present disclosure, the body portion of the rear frame wall 21 is provided on the rear side of the transparent cover plate 100. The connection wall D32 is connected to the front side surface of the body portion of the rear frame wall 21, and extends to be connected with the resisting part 211.

In some embodiments, the connection wall D32 includes a first connection wall D321 and a second connection wall D322. A plane where the first connection wall D321 is located is provided along the front-rear direction. A plane where the second connection wall D322 is located is provided along the inner-outer direction. In other words, the first connection wall D321 extends in the front-rear direction along a cross-section that is perpendicular to an extension direction of the first connection wall D321. The second connection wall D322 extends in the inner-outer direction along a cross-section that is perpendicular to an extension direction of the second connection wall D322.

In some embodiments, an avoidance groove is formed between the first connection wall, the second connection wall, and the rear frame wall body. The guiding section extends towards a direction of the avoidance groove. In this way, on the one hand, it can avoid spatial interference between the connection walls and the guiding section. Even if the guiding section is slightly longer due to a preparation process error, the guiding section can still extend into the avoidance groove without being obstructed by the connection walls. Therefore, the preparation accuracy of the connection walls and light filtering strip can be reduced, improving its process window, and thereby reducing the cost of the display device. On the other hand, when the transparent cover plate is guided by the guiding section for facilitating assembly, the avoidance groove can provide a certain space for the deformation of the guiding section, thereby facilitating the assembly process of the transparent cover plate. It can be understood that the extension of the guiding section towards the direction for the avoidance groove does not mean that the guiding section dives into the avoidance groove. The guiding section can either be completely outside the avoidance groove or partially inside the avoidance groove.

In some embodiments, a rear side end of the first connection wall D321 is connected to a front side surface of the body portion of the rear frame wall 21, a front side end of the first connection wall D321 is connected to an outer side end of the second connection wall D322, and an inner side end of the second connection wall D322 is connected to the resisting part 211.

In some embodiments of the present disclosure, a first groove 223 is provided on a rear side surface of the front frame wall 22, and a second groove 213 is provided on a front side surface of the rear frame wall 21. The infrared touch assembly 4 includes a circuit board A3 and an infrared emitter A1 or an infrared receiver A2, arranged on the circuit board A3.

Both sides of the circuit board A3 are respectively inserted into the first groove 223 and the second groove 213. The infrared emitter A1 or the infrared receiver A2 exactly faces the light filtering part 11, so as to emit infrared rays from the light filtering part 11 or receive infrared rays transmitted through the light filtering part 11. In some embodiments, the first groove 223 and the second groove 213 are arranged, exactly facing each other along the front-rear direction.

In some embodiments of the present disclosure, a first protruding platform 222 is provided on the rear side surface of the front frame wall 22, the first protruding platform 222 protruding to the rear side. The first groove 223 is provided on the first protruding platform 222. In this way, it can avoid local thinning of the front frame wall 22 caused by the first groove 223, thereby ensuring that the front frame wall 22 can still maintain high strength even with the first groove 223.

In some embodiments of the present disclosure, the second groove 213 is provided on the front side surface of the body portion of the rear frame wall 21.

In some embodiments, a second protruding platform 212 is provided on the front side surface of the body portion of the rear frame wall 21, the second protruding platform 212 protruding to the front side. The second groove 213 is provided on the second protruding platform 212.

In some embodiments, the second groove 213 is provided on an outer side of the first connection wall D321.

In some embodiments, the first connection wall D321 is also connected to the second protruding platform 212.

In some embodiments, a front side edge of an inner side of the body portion of the rear frame wall 21 is provided with a chamfer, so as to reduce a weight of the body portion of the rear frame wall 21 and save materials. Furthermore, an outer side end of the chamfer intersects with an inner side edge of the rear side end of the first connection wall D321, so as to reduce the material consumption and the weight of the body portion of the rear frame wall 21 as much as possible, while ensuring the connection strength between the first connection wall D321 and the body portion of the rear frame wall 21.

In some embodiments of the present disclosure, a wiring cavity 3 is formed between the circuit board A3 and the outer frame body 23. Signal ports of circuit board A3 are provided in the wiring cavity 3. In this way, when different outer frames 2 are spliced together, the circuit board A3 in each outer frame 2 can be electrically connected through the signal ports.

During the practical use of the display device, the transparent cover plate 100 and the display panel PNL are usually placed vertically. At this time, due to the unavoidable designed gap between the light filtering strip and the display screen, external water can enter the frame assembly along the designed gap, and then enter where the infrared touch assembly is located in the frame assembly, damaging the infrared emitter, the infrared receiver and other components that implement the infrared touch, thereby shortening the service life of the infrared touch screen.

In view of this, in some embodiments of the present disclosure, a display device is also provided. In the display device, a first mounting chamber is arranged on the rear frame wall 21, and a first insertion part is arranged on the light filtering strip cooperating with the first mounting chamber. The first insertion part is inserted into or embedded in the first mounting chamber, to achieve the connection of the light filtering strip and the frame assembly 200. Due to the fact that a first opening of the first mounting chamber is aligned with a second opening of the wiring cavity formed by the frame assembly 200, the first opening of the first mounting chamber faces a side where the transparent cover plate is located. Therefore, when external water flows from the transparent cover plate into the frame assembly 200, the water will be received by the first mounting chamber and will not flow into the wiring cavity of the frame assembly 200, thereby improving the waterproof performance of the infrared touch display device.

Figure 3:
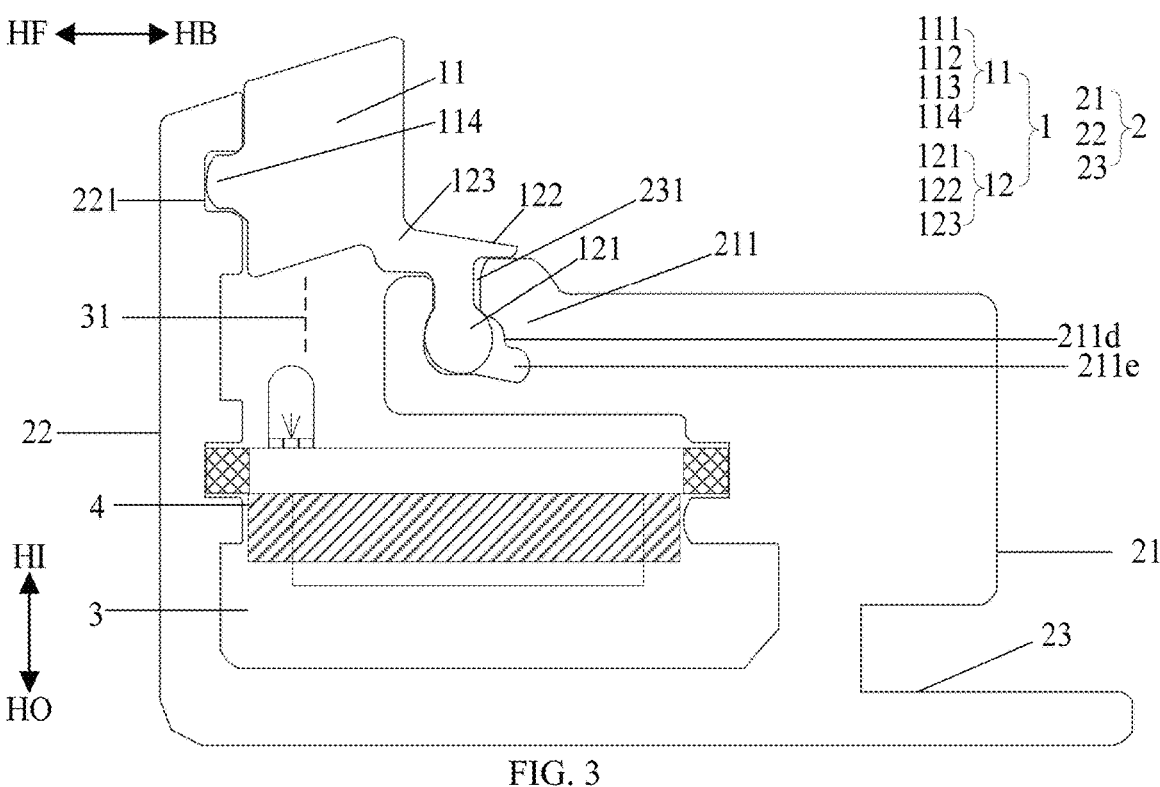
Figure 4:
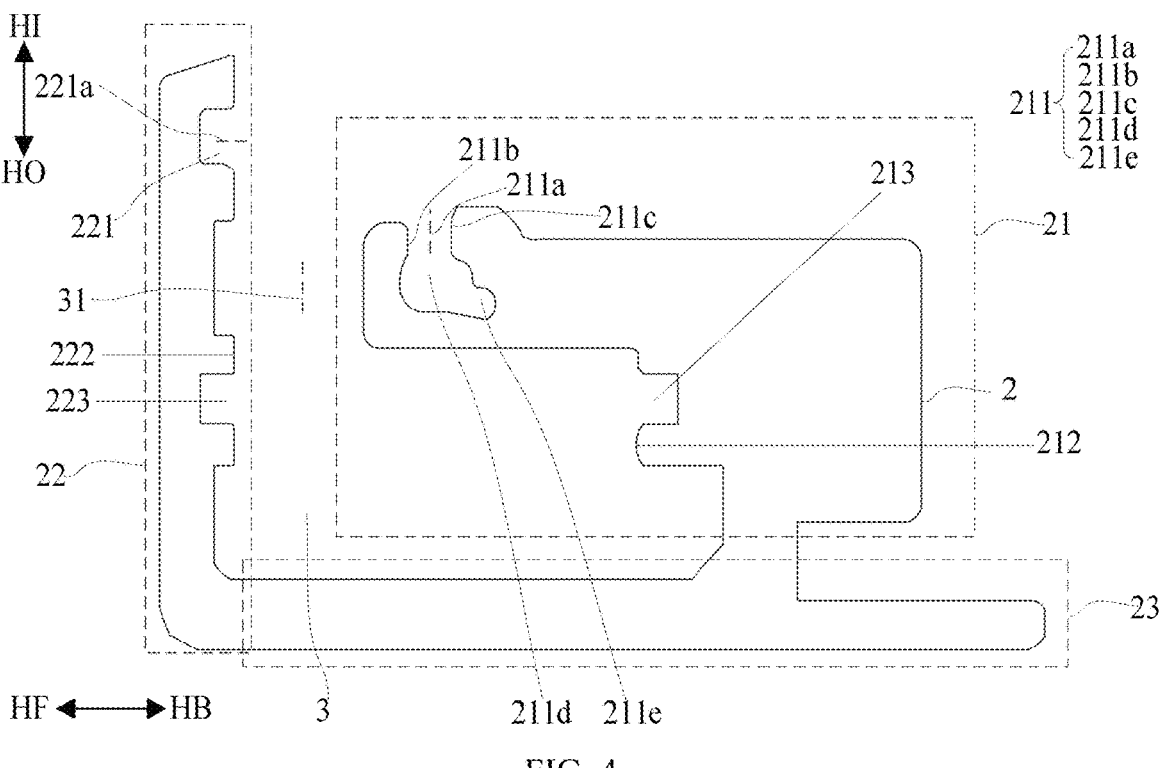

FIG. 3 shows a schematic diagram of an assembled structure of an infrared touch assembly and a frame assembly 200 provided in embodiments of the present disclosure, and FIG. 4 shows a schematic diagram of a structure of the frame assembly 200 in FIG. 3. As shown in FIGS. 3 and 4, the display device includes a transparent cover plate 100 and a frame assembly 200. The frame assembly 200 includes an outer frame 2 and a light filtering strip 1. The light filtering strip 1 includes a light filtering part 11 and a buffer part 12. It should be noted that the outer frame 2 refers to a frame structure of the frame assembly 200 without the light filtering strip 1, and the frame assembly 200 and the outer frame 2 are used indiscriminately to refer to the frame structure of the frame assembly 200 without the light filtering strip 1 in the following description.

As shown in FIGS. 3 and 4, the light filtering part 11 presses at a front edge of the transparent cover plate 100. The outer frame 2 has a front frame wall 22 and a rear frame wall 21, with an inner side of the front frame wall 22 pressing on a front side surface of the light filtering part 11. The rear frame wall 21 has a resisting part 211 that resists against an outer side of the buffer part 12, and the buffer part 12 is located between the resisting part 211 and an outer side surface of the transparent cover plate 100. The display device further includes an infrared touch assembly 4. The infrared touch assembly 4 is accommodated in a wiring cavity 3 formed inside the frame assembly 200. As shown in FIG. 2, the infrared touch assembly 4 is fixed between the front frame wall 22 and the rear frame wall 21, and is equipped with an infrared emitter or receiver facing the light filtering part 11. The display panel PNL (see FIG. 2) is fixed behind the transparent cover plate 100.

The infrared touch assembly 4 is accommodated in the wiring cavity 3. The light filtering strip 1 includes a first insertion part 121, and the resisting part 211 includes a first mounting chamber 211*d*. The first insertion part 121 is inserted into or embedded in the first mounting chamber 211*d*. One side of the first mounting chamber 211*d* is provided with a first opening 211*a*.

In some embodiments, the wiring cavity 3 has a second opening 31 configured for emitting or receiving touch light signals, and an opening direction of the first opening 211*a* is the same as an opening direction of the second opening 31.

In some embodiments, the wiring cavity 3 can be a space provided by the frame assembly 200 that can accommodate the infrared touch assembly 4. The infrared touch assembly 4 can also be other type of optical touch assembly that can achieve touch. The wiring cavity 3 at least includes an installation space that can be provided for the light emitting devices of the infrared touch assembly 4. Touch light signals are emitted or received from the second opening 31 of the installation space. The light filtering strip 1 can cover the second opening to filter some of the light and avoid interference with the infrared touch assembly. For example, for the infrared touch assembly 4, the light filtering strip 1 shields the visible light from the outside and transmits the infrared light. By covering the second opening 31 with the light filtering strip 1, the infrared touch assembly 4 receives the infrared light without interference from other visible light, enabling the optical touch device to achieve touch based on the infrared light.

In some embodiments, the wiring cavity 3 can be located in an area enclosed by the outer frame 2 and the light filtering strip 1. For example, as shown in FIG. 3, the infrared touch assembly 4 is located in the gap between the outer frame 2 and the light filtering strip 1. The light emitted by the infrared touch assembly 4 can radiate to the light filtering strip 1, and then be refracted by the light filtering strip 1 to be parallel to the display screen of the optical touch device.

The opening direction of the second opening 31 determines a light output position of the infrared touch assembly 4. Since the light filtering strip 1 can refract the light emitted by the infrared touch assembly 4, when the light filtering strip 1 covers the second opening 31, the light filtering strip 1 can refract the light to be parallel to the transparent cover plate 100 of the display screen in the optical touch device, so that the infrared touch assembly 4 can emit light signals to the opposite side or receive light signals emitted from the opposite side, avoiding being affected by the transparent cover plate 100. It can be understood that an orthographic projection of the second opening 31 on the outer frame does not overlap with an orthographic projection of the transparent cover plate 100 on the outer frame, to avoid the situation where some of the emitted light cannot be emitted to the opposite side.

In some embodiments, the opening direction of the first opening 211*a* can refer to an opening on a side to which the first mounting chamber 211*d* faces, which needs to be distinguished from an aperture direction of the first opening 211*a*. Similarly, the opening direction of the second opening 31 refers to the opening on a side to which the wiring cavity 3 faces, and an aperture direction of the second opening 31 is orthogonal to the opening direction of the second opening 31. Specifically, as shown in FIG. 4, the first mounting chamber 211*d* opens along an inner-outer direction, and thus the opening direction of the first opening 211*a* can face an inner side direction, while the aperture direction of the first opening 211*a* is along a front-rear direction. The opening direction of the second opening 31 can also be along the inner-outer direction.

The first mounting chamber 211*d* can be located close to the infrared touch assembly 4 and close to the display screen of the optical touch device. In this way, when the opening direction of the first opening 211*a* of the first mounting chamber 211*d* is the same as the opening direction of the second opening 31, the first insertion part 121 covers a part of the frame assembly 200 at a position close to the infrared touch assembly 4. Therefore, when the first insertion part 121 is inserted into the first mounting chamber 211*d*, some area of the first insertion part 121 can also refract the light signals, so that the light signals can emit in a direction parallel to the display screen, thereby reducing the touch height of the optical touch device.

The opening direction of the first opening 211*a* and the opening direction of the second opening 31 are the same, which can be the opening direction of the first opening 211*a* and the opening direction of the second opening 31 are exactly the same, or the opening direction of the first opening 211*a* and the opening direction of the second opening 31 are substantially the same. In the case where the opening direction of the first opening 211*a* and the opening direction of the second opening 31 are exactly the same, and where the opening direction of the second opening 31 is towards the inner side direction, the opening direction of the first opening 211*a* is also towards the inner side direction. As shown in FIG. 3, the first insertion part 121 can be connected to the first mounting chamber 211*d* on an outer side of the transparent cover plate 100, so that the light signals emitted from the second opening 31 can be refracted on the side of the transparent cover plate, thereby reducing the touch height of the optical touch device. In the case where the opening direction of the first opening 211*a* and the opening direction of the second opening 31 are substantially the same, the opening direction of the first opening 211*a* can be substantially parallel to the opening direction of the second opening 31, which means that the opening direction of the first opening 211*a* and the opening direction of the second opening 31 can have an included angle of 0°-5°. Within this range, the light filtering strip 1 can also refract, on the side of the transparent cover plate 100, the light signals emitted from the second opening 31, thereby reducing the touch height of the optical touch device.

The light filtering strip 1 includes a first insertion part 121, through which the light filtering strip 1 can be fixed in the first mounting chamber 211*d* of the frame assembly 200 of the optical touch device.

In some embodiments, the frame assembly 200 can be provided with multiple mounting chambers, which can be located at different positions of the frame assembly 200. Therefore, the light filtering strip 1 can include multiple insertion parts corresponding to the multiple mounting chambers, and the multiple insertion parts are inserted into or embedded in the multiple mounting chambers, thereby improving the stability of the connection between the light filtering strip 1 and the frame assembly 200 (outer frame 2).

In some embodiments, a shape of the first insertion part 121 can be irregular or regular. Specifically, the shape of the first insertion part 121 can include an inverted T-shaped, an L-shaped, an irregular spherical shape, etc. FIG. 3 is taken as an example, a cross-section of the first insertion part 121 on a plane perpendicular to the transparent cover plate 100 and perpendicular to an emitting surface of the infrared touch assembly 4 can be approximately L-shaped, inverted T-shaped, or similar to a shape of a light bulb.

In some embodiments, when an orthographic projection of the first insertion part 121 on the plane perpendicular to the transparent cover plate 100 and perpendicular to the emitting surface of the infrared touch assembly 4 is approximately L-shaped, an orthographic projection of the first mounting chamber 211*d* in the frame assembly 200 on the aforementioned plane can be L-shaped that is fit to the first insertion part 121. Similarly, when the orthographic projection of the first insertion part 121 on the plane perpendicular to the transparent cover plate 100 and perpendicular to the emitting surface of the infrared touch assembly 4 is approximately an inverted T-shaped, the orthographic projection of the first mounting chamber 211*d* in the frame assembly 200 on the aforementioned plane can be a shape that is fit to the first insertion part 121. When the orthographic projection of the first insertion part 121 on the plane perpendicular to the transparent cover plate 100 and perpendicular to the emitting surface of the infrared touch assembly 4 is approximately spherical, the orthographic projection of the first mounting chamber 211*d* in the frame assembly 200 on the aforementioned plane can be a spherical shape that is fit to the first insertion part 121. When adopting the design above, it makes it difficult for the first insertion part 121 to detach from the first mounting chamber 211*d*.

In some embodiments, since the light filtering strip 1 is made of a plastic material and has hydrophobicity, the light filtering strip 1 can also be partially extended to absorb moisture that may enter the frame assembly 200, providing waterproof performance for the optical touch device.

According to the optical touch display device provided in embodiments of the present disclosure, a first mounting chamber 211*d* is arranged in the frame assembly 200, and the opening direction of the first opening 211*a* of the first mounting chamber 211*d* is parallel to the opening direction of the second opening 31 of the wiring cavity 3 accommodating the infrared touch assembly 4 in the frame assembly 200. In this way, when external water flows into the frame assembly along the transparent cover plate 100 of the optical touch device, the water will be received by the first mounting chamber 211*d*, thereby preventing the water from directly entering the wiring cavity 3 of the frame assembly, causing damage to the infrared touch assembly 4 in the wiring cavity 3. Moreover, when the first insertion part 121 of the light filtering strip 1 is inserted into or embedded in the first mounting chamber 211*d*, the first insertion part 121 of the light filtering strip 1 is close to the infrared touch assembly 4 and close to the side surface of the transparent cover plate in the optical touch device, thereby reducing the touch height of the optical touch device.

Reference is continued to be made to FIG. 3, the light filtering strip 1 covers the second opening 31. In this way, the light signals emitted by the infrared touch assembly 4 located in the wiring cavity 3 can be refracted by the light filtering strip 1 when exiting the second opening 31, allowing the light signals to be transmitted parallel to the transparent cover plate. As a result, the emitted light signals are transmitted to the opposite side. Similarly, the light signals on the opposite side can be refracted by the light filtering strip 1 and transmitted through the second opening 31 to the infrared touch assembly 4 for reception. In this way, when a touch event occurs, the location of the touch operation can be determined based on light signals being not received.

In some embodiments, considering that there is a designed gap between the transparent cover plate 100 and the light filtering strip 1 in the optical touch device, water can flow into the frame assembly through the designed gap. The light filtering strip 1 is usually made of a plastic material with poor hydrophilicity. Therefore, in embodiments of the present disclosure, the light filtering strip 1 can be used to guide the flow of water, so that the water entering from the gap can be guided to the outside to improve the service life of the optical touch device.

Reference is continued to be made to FIGS. 3 and 4, the first mounting chamber 211d includes a first wall 211b and a second wall 211c. The second wall 211c is located on a side of the first wall 211b away from the second opening 31, and a first gap 231 is formed between the second wall 211c and the first insertion part 121.

In some embodiments, the light filtering strip 1 includes a water bar 122 that covers the first gap 231.

In some embodiments, the first wall 211b and the second wall 211c are two opposite wall surfaces of the first mounting chamber 211d. When the first mounting chamber 211d is connected with the first insertion part 121, there are gaps between the two wall surfaces of the first mounting chamber 211d and the first insertion part 121. Therefore, the water may flow into the first mounting chamber 211d through the first gap 231 between the second wall 211c and the first insertion part 121, and then enter the wiring cavity 3, causing damage to the infrared touch assembly 4. Therefore, by using the water bar 122 of the light filtering strip 1 to cover the first gap 231, when external water flows inside through the gap between the light filtering strip 1 and the display screen, the water bar 122 can block the water from entering, along the first mounting chamber 211d, the wiring cavity 3 of the frame assembly 200 where the infrared touch assembly 4 is located, thereby preventing the water from entering the wiring cavity 3 and causing damage to the infrared touch assembly 4, which affects the service life of the device.

In some embodiments, the water bar 122 extends from the light filtering strip 1 towards the first opening 211a to block the first gap 231. Therefore, the water bar 122 can simultaneously block the second gap between the first wall 211b and the first insertion part 121. In some embodiments, a structure of the light filtering strip 1 close to a side of the second opening 31 can block the second gap, and the structure of the light filtering strip 1 close to the side of the second opening 31 can be in close contact with the surface of the frame assembly 200. In this way, the light filtering strip 1 seals and blocks the second gap, so that the outlet of the second gap is blocked and the water cannot overflow outward, thereby preventing the water from flowing to the infrared touch assembly. In some other embodiments, the first insertion part 121 can be in close contact with a bottom wall of the first mounting chamber 211d, so that the second gap is formed as a sealed gap, thereby preventing the water from flowing from the first gap 231 into the second gap.

In some embodiments, at a position where the first gap is formed, the water bar 122 can be in close contact with the frame assembly 200. In some other embodiments, there may be a gap between the water bar 122 and the frame assembly 200 at position where the first gap is formed, allowing water to flow into the first mounting chamber 211d through the first gap.

In some embodiments, the water bar 122 can be formed by extending from a portion of the first insertion part 121, to facilitate blocking the first gap 231 formed by the first insertion part 121 and the second wall 211c. The orthographic projection of the water bar 122 on the plane perpendicular to the transparent cover plate 100 and perpendicular to the emitting surface of the infrared touch assembly 4 is orthogonal to the opening direction of the second opening 31, or at a certain angle to the opening direction of the second opening 31. The angle is not specifically limited in embodiments of the present disclosure, as long as it can block the water.

In some embodiments, when the orthographic projection of the water bar 122 on the plane perpendicular to the transparent cover plate 100 and perpendicular to the emitting surface of the infrared touch assembly 4 is orthogonal to the opening direction of the second opening 31, as shown in FIG. 3, when water flows from one side of the light filtering strip 1 to the water bar 122, the water is blocked by the water bar 122 and cannot flow into the location of the infrared touch assembly 4. When there is a large accumulation of water, the water bar 122 can also guide the water to the surface of the frame assembly 200, which then flows out of the frame assembly 200.

In the case where the orthographic projection of the water bar 122 on the plane perpendicular to the transparent cover plate 100 and perpendicular to the emitting surface of the infrared touch assembly 4 is at a certain angle to the opening direction of the second opening 31, as shown in FIG. 3, water bar 122 includes a slope inclined towards the first opening 211a on a side away from the second opening 31. Therefore, when the water flows from one side of the light filtering strip 1 to the water bar 122, the water can be directly guided by the water bar 122 to the surface of the frame assembly 200, and then flows out of the frame assembly 200 along the surface of the frame assembly 200, thereby accelerating the speed of the water flowing out of the frame assembly 200 and improving the waterproof performance of the frame assembly 200.

Reference is continued to be made to FIG. 3, the water bar 122 includes a connecting end connected to the light filtering strip 1 and a free end not connected to the light filtering strip 1. The free end has a slope inclined towards the first opening 211a. In this way, when the water accumulates at the position where the water bar 122 is located, the water can be guided by the slope towards the surface of the frame assembly 200, thereby avoiding the water flowing into the first gap 231.

Figure 5:
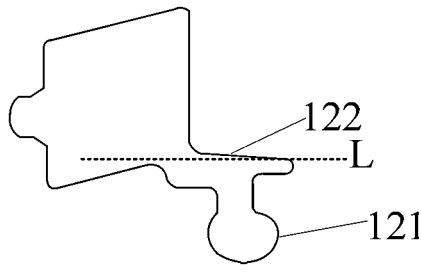

The slope of the water bar 122 can be represented by an angle between the water bar 122 and the first opening 211a. FIG. 5 shows a schematic diagram of a structure of the water bar 122 in some embodiments of the present disclosure. As shown in FIG. 5, assuming that the aperture direction of the first opening 211a is L, and there is an angle between a side of the water bar 122 facing away from the first opening 211a and the aperture direction L, which can be larger than 0 degree and less than 90 degrees. At the same time, the water bar 122 takes the aperture direction L as a horizontal line, and a slope of the slope of the water bar 122 is less than 0 relative to the horizontal line, which causes the slope to tilt towards the side where the first gap 231 is located.

In some embodiments, a side of the water bar 122 close to the first gap 231 can be parallel to the aperture direction L to make it easier for the water bar 122 to cover the first gap 231 and the second gap between the first insertion part 121 and the first wall 211b.

In some embodiments, there is a gap between the water bar 122 and a side of the frame assembly 200 close to the water bar 122, that is, the water bar 122 does not seal the first gap 231. Therefore, some water can flow into the first mounting chamber 211d along the gap between the water bar 122 and the side of the frame assembly 200 close to the water bar 122, and then the water can accumulate in the first mounting chamber 211d.

In this case, there is a second gap between the first wall 211b and the first insertion part 121, and the light filtering strip 1 seals and blocks the second gap. By blocking the second gap between the first wall 211*b* and the first insertion part 121 with the light filtering strip 1, the water having flowed into the first mounting chamber 211*d* can be prevented from entering the wiring cavity 3 along the second gap between the first wall 211*b* and the first insertion part 121, which may damage the infrared touch assembly 4.

Reference is continued to be made to FIGS. 3 and 4, in some embodiments, the resisting part 211 further includes a water storage tank 211*e*, which is communicated with the first mounting chamber 211*d*.

In some embodiments, through the communication between the water storage tank 211*e* and the first mounting chamber 211*d*, when some water flows into the first mounting chamber 211*d* along the first gap 231, the water entering the first mounting chamber 211*d* can be accumulated in the water storage tank 211*e*, thereby avoiding the case where the space inside the first mounting chamber 211*d* is small and the water flows into the wiring cavity 3 along the second gap, damaging the infrared touch assembly 4 therein.

The water storage tank 211*e* can also be used in conjunction with the water bar 122 in the light filtering strip 1. Most of the water is blocked by the water bar 122 from flowing into the first mounting chamber 211*d*, while a small portion of the water that is not blocked enters the first mounting chamber 211*d* and flows into the water storage tank 211*e*. In this way, the waterproof performance of the optical touch display device can be improved from two aspects.

Due to the communication between the water storage tank 211*e* and the first mounting chamber 211*d*, and due to the presence of gaps between the first wall 211*b*, the second wall 211*c* of the first mounting chamber 211*d* and the first insertion part 121, the water accumulated in the water storage tank 211*e* can leave the tank based on evaporation, thereby avoiding the case where excessive water accumulates in the water storage tank 211*e* and enters the wiring cavity 3 of the frame assembly 200.

In some embodiments, the water storage tank 211*e* is located on a side of the first mounting chamber 211*d* away from the first opening 211*a*. In some embodiments, the water storage tank 211*e* is located on a side of the first mounting chamber 211*d* away from the second opening 31.

In some embodiments, the water storage tank 211*e* can be located on the side of the first mounting chamber 211*d* away from the first opening 211*a*, or located on the side of the first mounting chamber 211*d* away from the second opening 31, or located on the side of the first mounting chamber 211*d* away from the first opening 211*a* and away from the second opening 31. In this way, the accumulated water in the water storage tank 211*e* can be stored at a position away from where the infrared touch assembly 4 is located, thereby preventing the water from entering the wiring cavity 3 of the frame assembly 200 and damaging the infrared touch assembly 4.

In some embodiments, in the case where the water storage tank 211*e* is located on the side of the first mounting chamber 211*d* away from the first opening 211*a*, the water storage tank 211*e* can be located at the chamber bottom of the first mounting chamber 211*d* and extend away from the first opening 211*a*. In this way, the water entering along the first gap 231 can directly flow into the bottom of the first mounting chamber 211*d* along the second wall 211*c*, and then into the water storage tank 211*e*, thereby being accumulated in the water storage tank 211*e*. In the case where the water storage tank 211*e* is located on the side of the first mounting chamber 211*d* away from the second opening 31, the water storage tank 211*e* can be connected to the wall surface of the second wall 211*c* and extends generally in a rear direction. In this way, the water entering along the first gap 231 can flow into the water storage tank 211*e* along the wall surface of the second wall 211*c*, thereby being accumulated in the water storage tank 211*e*. In the case where the water storage tank 211*e* is located on the side of the first mounting chamber 211*d* away from the first opening 211*a* and away from the second opening 31, as shown in FIG. 3, the water storage tank 211*e* extends in the direction away from the second opening 31 and tilts towards the direction away from the first opening 211*a*. When the water enters the first mounting chamber 211*d*, it flows into the bottom of the first mounting chamber 211*d* along the wall surface of the first mounting chamber 211*d* and gradually enters the water storage tank 211*e* along the inclined surface, allowing the water storage tank 211*e* to achieve the water storage function. Therefore, when the water storage tank 211*e* extends in the direction away from the second opening 31, the water flowing into the first mounting chamber 211*d* will be accumulated on the side of the first mounting chamber 211*d* away from the infrared touch assembly 4, thereby reducing the risk of water in the water storage tank 211*e* overflowing out of the first mounting chamber 211*d* along the second gap and eroding the infrared touch assembly 4.

In some embodiments, a cross-sectional area of the water storage tank 211*e* is 2-3 mm$^2$, and at this cross-sectional area, the water storage tank 211*e* can fully meet the water storage requirements. In some embodiments, the cross-sectional area can include: a first area of a cross-section of the water storage tank 211*e* formed by a plane perpendicular to the opening direction of the first opening 211*a* of the first mounting chamber 211*d*, and a second area of a cross-section of the water storage tank 211*e* formed by a plane perpendicular to the aperture direction of the first opening 211*a* of the first mounting chamber 211*d*. The first area is 2-3 mm$^2$, the second area is 2-3 mm$^2$, and the first area can be larger than the second area.

The cross-sectional area of the water storage tank 211*e* can be, for example, an area of an orthographic projection of the water storage tank 211*e* on the plane perpendicular to the transparent cover plate 100 and perpendicular to the emitting surface of the infrared touch assembly 4, as shown in FIG. 3.

In some embodiments, the cross-sectional area of the water storage tank 211*e* can be 2 mm$^2$, 2.3 mm$^2$, 2.5 mm$^2$, 2.8 mm$^2$, or 3 mm$^2$.

In some embodiments, the material of the chamber wall of the first mounting chamber 211*d* can also be improved to make the first mounting chamber 211*d* have water absorption capacity, further enhancing the waterproof performance of the frame assembly. In some embodiments, a portion of the chamber wall or the whole chamber wall of the first mounting chamber 211*d* can be coated with a water absorbing film.

In some embodiments, by laying a water absorbing film on a portion of the chamber wall or the whole chamber wall of the first mounting chamber 211*d*, the water entering along the first gap 231 can be fully or partially absorbed by the chamber wall of the first mounting chamber 211*d*. This can achieve waterproofing through both the water absorbing film and the water storage tank 211*e*, avoiding the accumulation of excessive water in the water storage tank 211*e*, which may cause some water to overflow from the first mounting chamber 211*d* and enter the wiring cavity 3 of the frame assembly 200. Therefore, the waterproof performance of the optical touch display device can be further improved.

In some embodiments, the water absorbing film can be materials such as sponge, activated carbon, or other materials that have water absorbing properties.

In some embodiments, referring to FIG. 4, a size of at least a portion of the internal space of the first mounting chamber 211*d* in the target direction is larger than a size of the first opening 211*a* in the target direction. In some embodiments, the target direction is orthogonal to the opening direction of the first opening 211*a*. As shown in FIG. 4, the target direction is, for example, along a front-rear direction.

In some embodiments, the size of at least a portion of the internal space of the first mounting chamber 211*d* in the target direction is larger than the size of the first opening 211*a* in the target direction, so that the first opening 211*a* of the first mounting chamber 211*d* is designed like a small-mouth well, and the shape of the first insertion part 121 is fit to the first mounting chamber 211*d*. In this way, when the first insertion part 121 is inserted into the first mounting chamber 211*d*, the first insertion part 121 will be restricted within the first mounting chamber 211*d*, preventing the first insertion part 121 from detaching from the first mounting chamber 211*d* when subjected to an external impact, thereby improving the anti-detachment performance of the frame assembly of the optical touch display device.

FIG. 3 is taken as an example, when the first insertion part 121 of the light filtering strip 1 is inserted into the first mounting chamber 211*d*, the size of the internal space of the first mounting chamber 211*d* along the front-rear direction is larger than the size of the first opening 211*a* along the front-rear direction. Therefore, the first insertion part 121 is restricted within the first mounting chamber 211*d* and is difficult to detach from the first opening 211*a*. In this way, when the optical touch device is subjected to an external impact, the first mounting chamber 211*d* can provide support force for the light filtering strip 1, thereby preventing the light filtering strip 1 from jumping out of the frame assembly 200.

In some embodiments, FIG. 4 is taken as an example, the size of the internal space of the first mounting chamber 211*d* in the front-rear direction can gradually increase and then gradually decrease along the inner-outer direction.

In some embodiments, the size of the first mounting chamber 211*d* in the front-rear direction can gradually increase and then gradually decrease along the inner-outer direction, which means that along the inner-outer direction, the size of the first mounting chamber 211*d* in the front-rear direction increases linearly and then decreases linearly, or along the inner-outer direction, the size of the first mounting chamber 211*d* in the front-rear direction increases linearly and then decreases nonlinearly, or along the inner-outer direction, the size of the first mounting chamber 211*d* in the front-rear direction increases nonlinearly and then decreases linearly, or along the inner-outer direction, the size of the first mounting chamber 211*d* in the front-rear direction increases nonlinearly and then decreases nonlinearly.

In some embodiments, along the inner-outer direction, when the size of the first mounting chamber 211*d* in the front-rear direction increases linearly and decreases linearly, the cross-section of the first mounting chamber 211*d* can be of a diamond shape, specifically, it can be a regular diamond shape or an irregular diamond shape.

In some embodiments, along the inner-outer direction, if the size of the first mounting chamber 211*d* in the front-rear direction increases linearly and decreases nonlinearly, the side wall surface of the first mounting chamber 211*d* can be composed of a linear inclined surface and a circular arc surface, with the inclined surface being close to the first opening 211*a*, and the circular arc surface being close to the bottom of the first mounting chamber 211*d*. In some embodiments, along the inner-outer direction, if the size of the first mounting chamber 211*d* in the front-rear direction increases nonlinearly and decreases linearly, the inclined surface is close to the bottom of the first mounting chamber 211*d*, and the circular arc surface is close to the first opening 211*a*.

In some embodiments, along the inner-outer direction, if the size of the first mounting chamber 211*d* in the front-rear direction increases nonlinearly and decreases nonlinearly, the side wall of the first mounting chamber 211*d* can be composed of circular arc surfaces.

In some embodiments, the first mounting chamber 211*d* includes multiple wall surfaces along the inner-outer direction, and the shape of each wall surface can be the same or different. For example, the first mounting chamber 211*d* can include two wall surfaces, one of which is an inclined surface and the other of which is a circular arc surface. In some embodiments, the two wall surfaces can also be two circular arc surfaces.

It can be understood that the cross-sectional shape of the internal chamber of the first mounting chamber 211*d* can be symmetrical or asymmetrical, as long as it ensures that the size of at least a portion of the first mounting chamber 211*d* in the target direction is larger than the size of the first opening in the target direction. In summary, the cross-section of the internal chamber of the first mounting chamber 211*d* can be circular notch-shaped, and the first opening 211*a* is located at a notch of the circular notch. Alternatively, as shown in FIG. 4, the cross-section of the internal chamber of the first mounting chamber 211*d* can be approximately L-shaped, and a portion of the side wall have a circular arc surface, making the first mounting chamber 211*d* irregular in shape, thereby enhancing the performance of avoiding detachment.

Based on the above embodiments, the light filtering strip 1 can be connected to the frame assembly 200 (outer frame 2) through multiple insertion parts. In some embodiments, two mounting chambers can be used to fix the light filtering strip 1, which is beneficial for the stability of the light filtering strip 1 in the frame assembly 200. In some embodiments, a second mounting chamber 221 can be added on the basis of the first mounting chamber 211*d*, and used to fix the light filtering strip 1.

Reference is continued to be made to FIGS. 3 and 4, the frame assembly 200 also includes a second mounting chamber 221, with the first mounting chamber 211*d* and the second mounting chamber 221 being located on opposite sides of the second opening 31. In some embodiments, the second mounting chamber 221 has a third opening 221*a*, and an opening direction of the third opening 221*a* intersects with the opening direction of the first opening 211*a*.

In some embodiments, the light filtering strip 1 further includes a second insertion part 114, which is inserted into or embedded in the second mounting chamber 221.

In some embodiments, the second mounting chamber 221 and the first mounting chamber 211*d* can be located on opposite sides of the second opening 31, respectively, which allows the light filtering strip 1 to be positioned at the second opening 31, facilitating the refraction of light through the light filtering strip 1 and avoiding interference from different light sources on the infrared touch assembly 4.

In the case where the light filtering strip 1 is fixed using the first mounting chamber 211*d* and the second mounting chamber 221, the light filtering strip 1 further includes a second insertion part 114, which is inserted into or embedded in the second mounting chamber 221. In this case, if the light filtering strip 1 is subjected to an impact force, the first insertion part 121 in the first mounting chamber 211*d* is supported by a force formed by the wall surface of the first mounting chamber 211*d*, and the second insertion part 114 in the second mounting chamber 221 is supported by a force formed by the wall surface of the second mounting chamber 221, which can play a buffering role and further prevent the light filtering strip 1 from jumping off.

In the above embodiments, the opening direction of the third opening 221*a* intersects with the opening direction of the first opening 211*a*, so that the opening direction of the first opening 211*a* is different from the opening direction of the third opening 221*a*. As a result, the light filtering strip 1 is connected to the frame assembly 200 from different directions, thereby enhancing the connection stability between the light filtering strip 1 and the frame assembly 200 (outer frame 2). In some embodiments, an included angle between the opening direction of the third opening 221*a* and the opening direction of the first opening 211*a* can be between 30° and 150°, for example, the included angle between the opening direction of the third opening 221*a* and the opening direction of the first opening 211*a* is 30°, 60°, 90°, 120°, or 150°. It should be noted that the opening direction of the third opening 221*a* is not limited to the front-rear direction shown in the drawings, and the opening direction of the third opening 221*a* can have deviations from the front-rear direction, for example, relative to the front-rear direction, a 10° angle or a 20° angle is formed.

In some embodiments, the chambers of the first mounting chamber 211*d* and/or the second mounting chamber 221 can be spherical.

In some embodiments, the chamber of the first mounting chamber 211*d* is spherical, or the chamber of the second mounting chamber 221 is spherical, or both the chambers of the first mounting chamber 211*d* and the second mounting chamber 221 are spherical.

In some embodiments, in the case where the chamber of the first mounting chamber 211*d* is spherical, the shape of the first insertion part 121 is fit to the shape of the first mounting chamber 211*d*, and the spherical chamber can make the contact area between the first insertion part 121 and the chamber wall of the first mounting chamber 211*d* larger. In this way, when the light filtering strip 1 is subjected to an impact force, the impact force exerted on the first insertion part 121 can be reduced, and the circular arc surface of the chamber wall can act as a buffer, so that the light filtering strip 1 can withstand a larger impact force without jumping off, improving the performance of the light filtering strip 1 in avoiding detachment.

In some embodiments, in the case where the chamber of the second mounting chamber 221 is spherical, the shape of the second insertion part 114 is fit to the shape of the second mounting chamber 221, and the chamber wall of the second mounting chamber 221 is a circular arc surface. In this way, if the light filtering strip 1 is impacted, the circular arc surface can provide a buffering support for the second insertion part 114, avoiding damage to the light filtering strip 1 due to the impact.

In the case where the chambers of the first mounting chamber 211*d* and the second mounting chamber 221 are both spherical, the buffering support can be provided for the light filtering strip 1 in both directions, further reducing the impact exerted on the light filtering strip 1 and preventing the light filtering strip 1 from jumping out of the frame assembly 200 or being damaged.

In some embodiments, reference is continued to be made to FIGS. 3 and 4, there is at least one first region in the first insertion part 121, and a size of the first region in the first target direction is larger than a size of the first opening 211*a* in the first target direction, and/or there is at least one second region in the second insertion part 114, and a size of the second region in the second target direction is larger than a size of the third opening 221*a* in the second target direction.

In some embodiments, the first target direction is orthogonal to the opening direction of the first opening 211*a*, and the second target direction is orthogonal to the opening direction of the third opening 221*a*.

In some embodiments, FIG. 3 is taken as an example, the first target direction is the front-rear direction shown in FIG. 3, and the second target direction is the inner-outer direction shown in FIG. 3.

In some embodiments, the first region can be an area with the largest size of the first insertion part 121 in the front-rear direction, and the second region can be an area with the largest size of the second insertion part 114 in the inner-outer direction. For example, if the first insertion part 121 is spherical, then the first region is a position with the largest diameter of the spherical shape in the front-rear direction. If the first insertion part 121 is a triangle, then the first region is a position close to a base of the triangle. If the first insertion part 121 is L-shaped, then the first region is a position of a side of the 'L' parallel to the front-rear direction. Similarly, if the second insertion part 114 is spherical, then the second region is a position with the largest diameter of the spherical shape in the inner-outer direction. If the second insertion part 114 is a triangle, then the second region is located close to a base of the triangle. In some embodiments, the first region can be one area or include multiple areas. The second region can be one area or include multiple areas. If the first region is stepped-shaped, the sizes of platform areas of multiple steps can be larger than the size of the first opening 211*a* in the front-rear direction.

In some embodiments, it can be that the size of the first region of the first insertion part 121 in the front-rear direction is larger than the size of the first opening 211*a* in the front-rear direction, or it can be that the size of the second region of the second insertion part 114 in the inner-outer direction is larger than the size of the third opening 221*a* in the inner-outer direction, or it can be that the size of the first region of the first insertion part 121 in the front-rear direction is larger than the size of the first opening 211*a* in the front-rear direction, as well as the size of the second region of the second insertion part 114 in the inner-outer direction is larger than the size of the third opening 221*a* in the inner-outer direction.

In some embodiments, in the case where the size of the first region of the first insertion part 121 in the front-rear direction is larger than the size of the first opening 211*a* in the front-rear direction, the larger side of the first insertion part 121 can be restricted within the first mounting chamber 211*d* to prevent the first insertion part 121 from jumping out of the first mounting chamber 211*d*, and thus the light filtering strip 1 jumping out of the frame assembly. Similarly, in the case where the size of the second region of the second insertion part 114 in the inner-outer direction is larger than the size of the third opening 221*a* in the inner-outer direction, the larger side of the second insertion part 114 can be restricted within the second mounting chamber 221 to prevent the second insertion part 114 from jumping out of second mounting chamber 221, and thus the light filtering strip 1 jumping out of the frame assembly. In the case where the size of the first region of the first insertion part 121 in the front-rear direction is larger than the size of the first opening 211a in the front-rear direction, as well as the size of the second region of the second insertion part 114 in the inner-outer direction is larger than the size of the third opening 221a in the inner-outer direction, the first insertion part 121 is restricted within the first mounting chamber 211d, and at the same time the second insertion part 114 is restricted within the second mounting chamber 221. In this way, it is difficult for the light filtering strip 1 to escape from the frame assembly 200, further improving the stability of the light filtering strip 1.

It can be understood that the shape of the mounting chamber in the frame assembly 200 is fit to the shape of the insertion part of the light filtering strip 1, which can save space, reduce material waste, and ensure the stability of the light filtering strip 1. FIG. 3 and FIG. 4 are taken as examples, a shape of the orthographic projection of the first mounting chamber 211d on the plane perpendicular to the transparent cover plate 100 and perpendicular to the emitting surface of the infrared touch assembly 4 is consistent with a shape of the orthographic projection of the first insertion part 11 on that plane, and a shape of the orthographic projection of the second mounting chamber 221 on the plane perpendicular to the transparent cover plate 100 and perpendicular to the emitting surface of the infrared touch assembly 4 is consistent with a shape of the orthographic projection of the second insertion part 114 on that plane.

For example, when the orthographic projection of the first insertion part 121 on the plane perpendicular to the transparent cover plate 100 and perpendicular to the emitting surface of the infrared touch assembly 4 is approximately L-shaped, the orthographic projection of the first mounting chamber 211d on that plane is also approximately L-shaped. When the orthographic projection of the first insertion part 121 on the plane perpendicular to the transparent cover plate 100 and perpendicular to the emitting surface of the infrared touch assembly 4 is approximately inverted T-shaped, the orthographic projection of the first mounting chamber 211d on that plane is also approximately inverted T-shaped. When the orthographic projection of the first insertion part 121 on the plane perpendicular to the transparent cover plate 100 and perpendicular to the emitting surface of the infrared touch assembly 4 is approximately circular, the orthographic projection of the first mounting chamber 211d on that plane is also approximately circular. In this way, the first insertion part 121 can be fully fit to the first mounting chamber 211d, and when the light filtering strip 1 is subjected to a force due to the tilting of the transparent cover plate in the optical touch device, the first mounting chamber 211d can restrict the first insertion part 121, to prevent the first insertion part 121 from jumping out of the first mounting chamber 211d, which improves the performance of the frame assembly in avoiding the jumping off. Similarly, the second insertion part 114 can be fully fit to the second mounting chamber 221, and when the light filtering strip 1 is subjected to a force due to the tilting of the transparent cover plate in the optical touch device, the second mounting chamber 221 can restrict the second insertion part 114, to prevent the second insertion part 114 from jumping out of the second mounting chamber 221, which improves the performance of the frame assembly in avoiding the jumping off.

Figure 6:
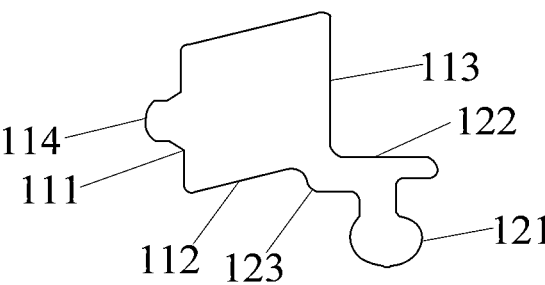

In some embodiments, referring to FIGS. 3 and 6, FIG. 6 shows a schematic diagram of a structure of the light filtering strip 1 in embodiments of the present disclosure. The light filtering strip 1 includes a light filtering part 11 and a buffer part 12. The light filtering part 11 includes a first surface 111, a second surface 112, a third surface 113, and a second insertion part 114. In some embodiments, the first surface 111 is adjacent to the second surface 112, and the third surface 113 is opposite to the first surface 111 and adjacent to the second surface 112. The buffer part 12 includes a first insertion part 121, a water bar 122, and a connection part 123. In some embodiments, the buffer part 12 is connected to the light filtering part 11 through the connection part 123.

The connection part 123 is connected to the second surface 112, and the second insertion part 114 is connected to the first surface 111, alternatively, the connection part 123 is connected to the third surface 113, and the second insertion part 114 is connected to the first surface 111, alternatively, the connection part 123 is connected to a connection between the second surface 112 and the third surface 113, and the second insertion part 114 is connected to the first surface 111.

In some embodiments, the connection part 123 can be located at different positions of the light filtering strip 1, as long as the buffer part 12 can be connected with the light filtering part 11.

Figure 7:
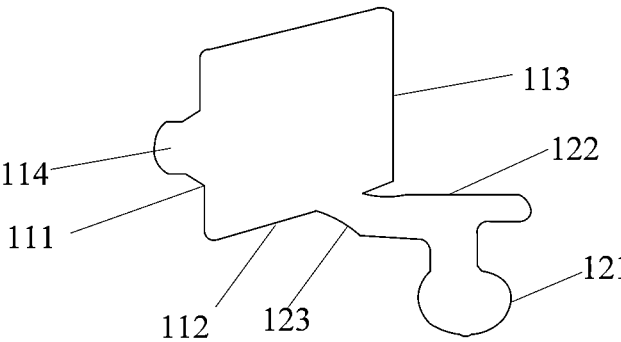

Reference can be made to FIG. 7, which shows a schematic diagram of a structure of the light filtering strip 1 provided in embodiments of the present disclosure. As shown in FIG. 7, the connection part 123 is connected to the second surface 112 of the light filtering part 11, and the second insertion part 114 is connected to the first surface 111. At this time, an extension direction of the connection part 123 intersects with the opening direction of the first opening 211a. In this way, in addition to achieving the fitting of the first insertion part 121 with the first mounting chamber 211d, the portion used for light filtering can also include a side edge of the transparent cover plate of the optical touch device, expanding the effective angle of the light emitted from or incident on the infrared touch assembly 4, and reducing the touch height.

Figure 8:
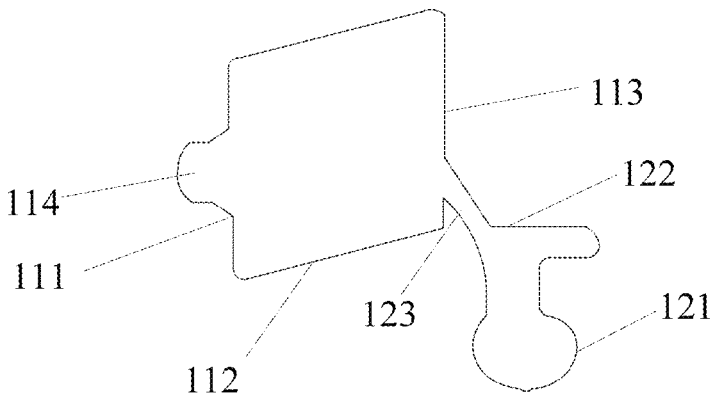

Reference is continued to be made to FIG. 8, which shows a schematic diagram of a structure of the light filtering strip 1 provided in embodiments of the present disclosure. As shown in FIG. 8, the connection part 123 is connected to the third surface 113 of the light filtering part 11, and the second insertion part 114 is connected to the first surface 111. At this time, the connection part 123 can be close to the connection between the second surface 112 and the third surface 113, which can avoid the increase in the distance between the light filtering part 11 and the transparent cover plate of the optical touch device due to the connection part 123. Moreover, through the connection part 123, a portion of the light filtering strip 1 can be located on a side of the transparent cover plate, thereby expanding the effective angle of the light emitted from or incident on the infrared touch assembly 4, and reducing the touch height.

Reference is continued to be made to FIG. 6, the connection part 123 is connected to the connection between the second surface 112 and the third surface 113, and the second insertion part 114 is located on the first surface 111. At this time, the connection part 123 can receive the light signals emitted from the infrared touch assembly 4 and refract it parallel to the display screen of the optical touch device. In this way, the light signals in the area where the connection part 123 is located can also be emitted to the other side or the light signals from the other side can also be received, reducing the touch height of the optical touch device.

As shown in FIG. 3, in the case where the connection part 123 is connected to the connection between the second surface 112 and the third surface 113, the connection part 123 is close to a side of the transparent cover plate of the optical touch device, which allows the light rays with larger emission angles in the infrared touch assembly 4 to be refracted at the connection part, the light rays then being able to propagate to the infrared touch assembly 4 located on the opposite side. Similarly, the light rays close to a side where the transparent cover plate is next to the light filtering part 11, after entering the light filtering strip 1, can be refracted by the connection part 123 to the position where the infrared touch assembly 4 is located. As a result, the effective emission angle and effective reception angle of the light signal can be increased. The specific effective angle on one side can be increased by 7.5 degrees. The touch height of the optical touch device can be reduced by 0.3-0.4 mm.

In some embodiments, reference is continued to be made to FIG. 4, the outer frame 2 has an outer frame body 23, a front frame wall 22, and a rear frame wall 21. In some embodiments, the outer frame body 23 is located on the outermost side of the outer frame 2, and the front frame wall 22 and the rear frame wall 21 are both located on the inner side of the outer frame body 23 and connected to the outer frame body 23.

In some embodiments of the present disclosure, the outer side surface of the outer frame body 23 can be substantially parallel to a normal of the display device. In some embodiments, the outer side surface of the outer frame body 23 can be inclined at a certain included angle relative to a normal direction of the display device, for example, at an included angle of 0°-10°, so that the outer side surface of the outer frame body 23 shows a certain inclination angle.

An outer side end of the front frame wall 22 can be connected to the outer frame body 23, and an inner side end of the front frame wall 22 can be in contact with and connected to the light filtering part 11, so that the light filtering part 11 presses on the front side edge of the transparent cover plate 100.

In some embodiments, the wiring cavity 3 is located in the space enclosed by the front frame wall 22, the rear frame wall 21, and the outer frame body 23. The first mounting chamber 211d is opened on a side of the rear frame wall 21 away from the outer frame body 23, and the second mounting chamber 221 is opened on a side of the front frame wall 22 facing the rear frame wall 21.

In some embodiments, the front frame wall 22 and the outer frame body 23 can be integrally formed, and further, the front frame wall 22, the rear frame wall 21, and the outer frame body 23 can be integrally formed. If the front frame wall 22 is opposite to the rear frame wall 21, the first mounting chamber 211d can be located in the rear frame wall 21 and located away from the outer frame body 23, so that the opening direction of the first opening 211a of the first mounting chamber 211d is the same as the opening direction of the second opening 31. The second mounting chamber 221 is located in the front frame wall 22 and faces the rear frame wall 21, which allows the embedded light filtering strip to be located in the second opening 31 and facilitate the positioning of the light filtering strip 1 through the first mounting chamber 211d and the second mounting chamber 221, ensuring the stability of the light filtering strip 1.

According to the display device provided in embodiments of the present disclosure, the first mounting chamber 211d is provided in the frame assembly 200, and the light output direction of the first opening 211a of the first mounting chamber 211d is parallel to the light output direction of the light filtering strip 1, so that the first insertion part 121 of the light filtering strip 1 can be inserted into the first mounting chamber 211d at an outer side edge of the display screen, thereby reducing the touch height of the frame assembly by refracting the light emitted by the infrared touch assembly 4 at the outer side edge of the display screen to be parallel to the display screen using the light filtering strip 1. Meanwhile, the light filtering strip 1 further includes the water bar 122 that covers the first gap 231 between the second wall 211c of the first mounting chamber 211d and the first insertion part 121, and the water bar 122 can be used together with the water storage tank 211e in the first mounting chamber 211d to prevent external water from flowing into the wiring cavity 3 of the frame assembly 200 that accommodates the infrared touch assembly 4, thereby improving the waterproof performance of the frame assembly. In addition, due to the fact that the size of at least a portion of the space inside the first mounting chamber 211d is larger than the size of the first opening 211a, and the size of one end of the first insertion part 121 away from the light filtering strip 1 is larger than the size of the other end of the first insertion part 121 close to the light filtering strip 1, the first insertion part 121 can be restricted within the first mounting chamber 211d, preventing the light filtering strip 1 from jumping out of the frame assembly 200 when subjected to the impact, and improving the stability of the light filtering strip 1.

Figure 9:
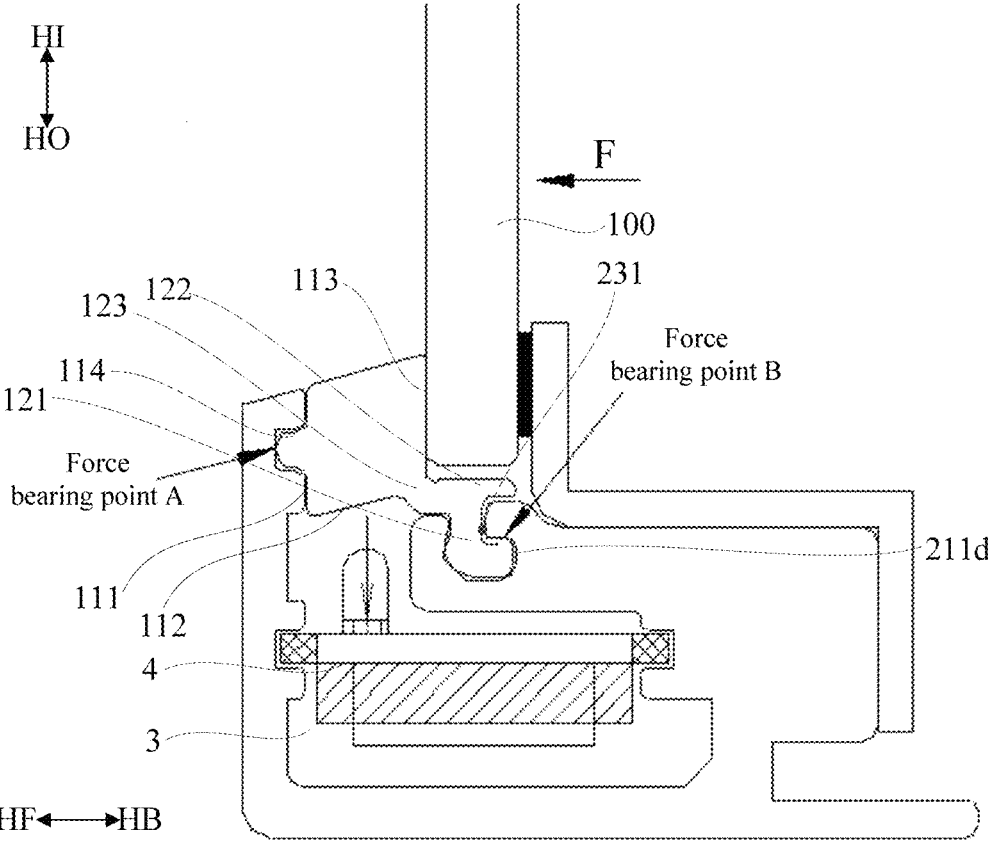

In some embodiments, as shown in FIGS. 3 and 9, the infrared touch assembly 4 is located in the wiring cavity 3 surrounded by the outer frame 2 and the light filtering strip 1, and the light output direction of the infrared touch assembly 4 faces towards the light filtering strip 1. In this way, the light filtering strip 1 can refract the light signals emitted by the infrared touch assembly 4, making the light parallel to the display screen. Due to the fact that the light output direction of the first opening 211a of the first mounting chamber 211d is parallel to the light output direction of the light filtering strip 1, the first insertion part 121 of the light filtering strip 1 is inserted into the first mounting chamber 211d at the side edge of the display screen, thereby reducing the touch height of the display device.

In the related art, the connection between light filtering strip 1 and frame assembly 200 is blocked, therefore, the light can only enter the light filtering strip from the front of the display screen, resulting in that some of the light emitted by infrared touch assembly 4 reflects at the display screen of the optical touch device due to the large incident angle, and thus resulting in a higher touch height of the optical touch device. In embodiments of the present disclosure, the first insertion part 121 and the water bar 122 are located at the side edge of the transparent cover plate 100, so that the light with the larger emission angle is refracted in an area where the first insertion part 121 is close to the light filtering strip 1, thereby allowing the light signals to be transmitted to the infrared touch assembly located on the opposite side. Similarly, the light signals close to a side where the transparent cover plate 100 is next to the light filtering strip 1, after entering the light filtering strip 1, can be refracted by the light filtering strip 1 to the position of the infrared touch assembly 4, which increases the effective emission angle and effective reception angle of the light signal. The specific effective angle on one side can be increased by 7.5 degrees. The touch height of the optical touch device can be reduced by 0.3-0.4 mm.

In some embodiments, a portion of the transparent cover plate 100 can be located in the gap between the light filtering strip 1 and the frame assembly 200, as shown in FIG. 9. A side of the light filtering strip 1 close to the transparent cover plate 100 can be in contact with a front side of the transparent cover plate 100. In this way, the light signals emitted by the infrared touch assembly 4 can be refracted to be parallel to the light emitting surface of the transparent cover plate 100, and the optical touch can be achieved by determining the touched position based on the reception of the light signals on the other side. In some embodiments, the side of the transparent cover plate 100 is located on the outer side of the transparent cover plate 100.

In some embodiments, the light filtering strip 1 further includes the water bar 122, and the water bar 122 can be located between the side of the transparent cover plate 100 and the first mounting chamber 211*d* of the frame assembly 200, so that a portion of the light filtering strip 1 is located on the outer side surface of the transparent cover plate 100, which allows the light signals with larger emission angles emitted by the infrared touch assembly 4 to be refracted parallel to the light emitting surface of the transparent cover plate 100, thereby reducing the touch height of the display device.

Figure 11:
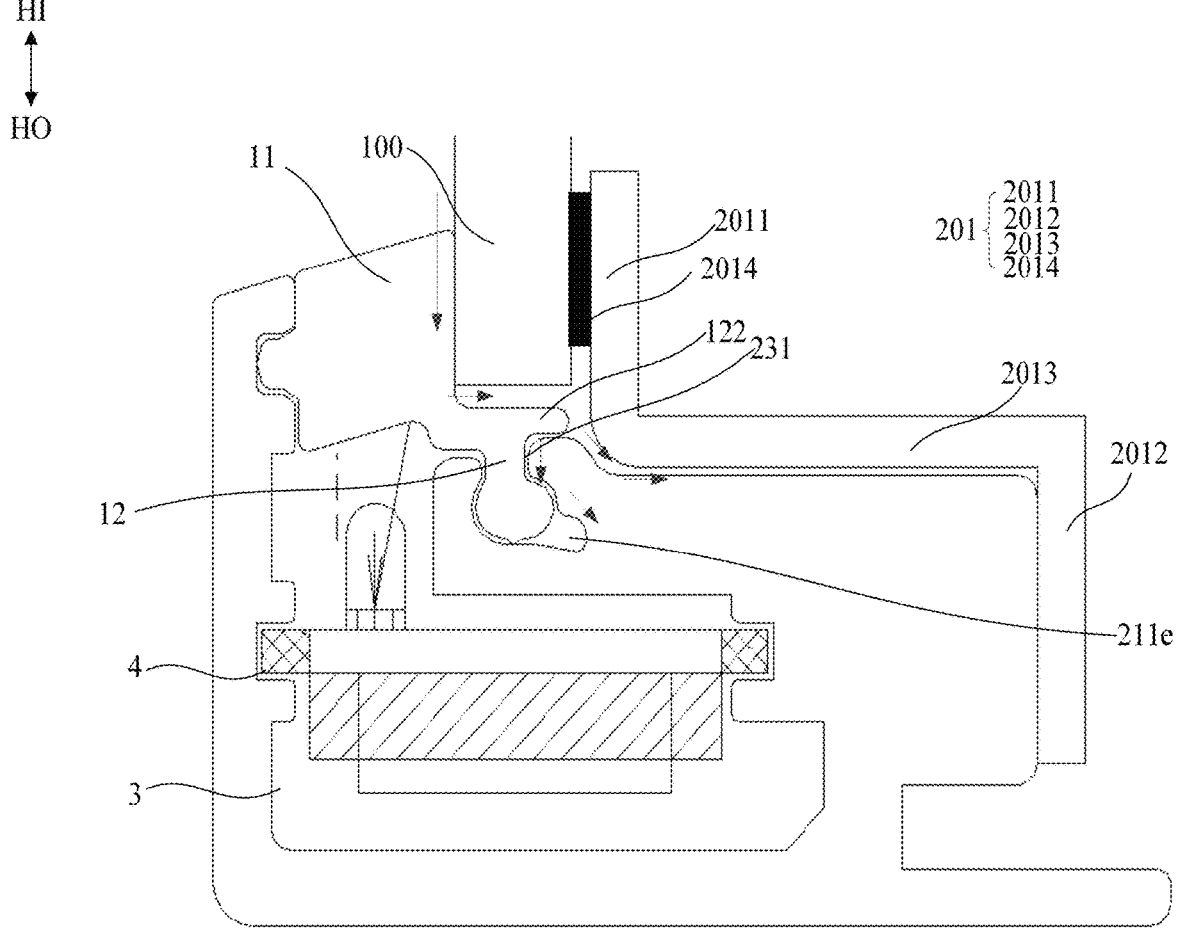

As shown in FIGS. 2 and 11, the frame assembly 200 further includes a supporting member 201, which is connected to the outer frame 2 and bonded to a rear side edge of the transparent cover plate 100 through an elastic material. In this way, the vibration generated by the transparent cover plate 100 during the touch can be at least partially absorbed by the elastic material. On the one hand, the vibration of the transparent cover plate 100 can be reduced, and on the other hand, the abnormal noise caused by rubbing between the transparent cover plate 100 and the supporting member 201 can be avoided.

In some embodiments of the present disclosure, the supporting member 201 includes a first supporting vertical wall 2011, a supporting transverse wall 2013, and a second supporting vertical wall 2012. A plane where the supporting transverse wall 2013 is located extends along the front-rear direction, and planes where the first supporting vertical wall 2011 and the second supporting vertical wall 2012 are located extend along the inner-outer direction. In other words, on a cross-section perpendicular to an extending direction of the supporting member 201, cross-sections of the first supporting vertical wall 2011 and the second supporting vertical wall 2012 extend in the inner-outer direction, and a cross-section of the supporting transverse wall 2013 extends in the front-rear direction.

The first supporting vertical wall 2011 is connected to a front side end of the supporting transverse wall 2013 and extends along the front-rear direction. The first supporting vertical wall 2011 and the rear side edge of the transparent cover plate 100 are bonded by using an elastic material. The second supporting vertical wall 2012 is connected to a rear side end of the supporting transverse wall 2013 and extends towards the outer side. The second supporting vertical wall 2012 is connected to the outer frame 2.

In some embodiments of the present disclosure, a bumper block 2014 can be provided between the first supporting vertical wall 2011 and the rear side edge of the transparent cover plate 100. The material of the bumper block 2014 can be silicone rubber or foam, which has a lower cost and can reduce the manufacturing cost of the display device, while ensuring the stability of the light filtering strip 1. In some embodiments, the material that is both elastic and adhesive can be provided, to facilitate adhesion between the first supporting vertical wall 2011 and the transparent cover plate 100. In some embodiments, double-sided adhesive VHB is provided between the first supporting vertical wall 2011 and the rear side edge of the transparent cover plate 100. In some embodiments, a width (the size along the inner-outer direction) of an adhesive surface between the double-sided adhesive and the transparent cover plate is 1.1-2.0 times, for example, 1.3-1.15 times, a width (the size along the inner-outer direction) of the contact surface between the light filtering part and the transparent cover plate, which allows the transparent cover plate 100 to have good impact resistance, thereby avoiding the jumping off of the light filtering strip 1.

In some embodiments, a composite layer formed through an adhesive layer and an elastic material layer can be provided between the first supporting vertical wall 2011 and the rear side edge of the transparent cover plate 100, to facilitate adhesion between the first supporting vertical wall 2011 and the transparent cover plate 100. In some embodiments, stacked adhesive layer, buffer foam layer, and adhesive layer can be provided between the first supporting vertical wall 2011 and the rear side edge of the transparent cover plate 100. In other words, the elastic material is the foam tape. In the assembled display device, the foam tape is compressed to provide rebound force to the transparent cover plate 100 (as pressure applied to the transparent cover plate 100), thereby ensuring a long-lasting and tight fit between the transparent cover plate 100 and the light filtering part 11, avoiding gaps between the transparent cover plate 100 and the light filtering part 11, and thus preventing moisture from entering the display device from the gaps between the transparent cover plate 100 and the light filtering part 11.

In some embodiments, a compression rate of the foam tape is 40%-60%. The higher the hardness of the foam tape, the lower the compression rate of the foam tape, as long as the foam tape can provide sufficient pressure for the transparent cover plate 100. In some embodiments, the compression rate of the foam tape refers to a ratio of a thickness reduction value (a thickness without compression—a thickness in use) of the foam tape in use to a thickness value of the foam tape without compression.

In some embodiments of the present disclosure, an inner side surface of the body portion of the rear frame wall 21 can be provided along the front-rear direction, and an outer side surface of the supporting transverse wall 2013 can resist against the inner side surface of the body portion of the rear frame wall 21. In this way, the body portion of the rear frame wall 21 can position and support the supporting transverse wall 2013, improving the bonding strength and stability between the supporting member 201 and the outer frame 2.

In some embodiments of the present disclosure, an assembly surface is provided on a rear side surface of the body portion of the rear frame wall 21, and a front side surface of the second supporting vertical wall 2012 can fit with the assembly surface.

In some embodiments of the present disclosure, the second supporting vertical wall 2012 can be fixed to the body portion of the rear frame wall 21, for example, through screws or adhesive.

In some embodiments of the present disclosure, a thickness (the size along the front-rear direction) of the body portion of the rear frame wall 21 can be greater than a thickness (the size along the inner-outer direction) of the outer frame body 23. For example, the thickness of the body portion of the rear frame wall 21 can be 1.2-2 times a maximum thickness of the outer frame body 23. In this way, on the one hand, the strength of the body portion of the rear frame wall 21 itself can be improved, so that the body portion of the rear frame wall 21 can have sufficient strength to bear the forces transmitted from the second supporting vertical wall 2012 and the resisting part 211. On the other hand, such arrangement can also increase a bonding area between the body portion of the rear frame wall 21 and the outer frame body 23, thereby enhancing the bonding strength between the two. As a result, the outer frame 2 is made to have sufficient strength to secure the transparent cover plate 100 and withstand the vibration generated when the transparent cover plate 100 is knocked (such as the collision between the touch pen and the transparent cover plate 100).

In some embodiments of the present disclosure, the display device is further provided with a back shell, and the back shell is located behind the display panel PNL and fixed to the frame assembly 200.

In some embodiments of the present disclosure, a gap can be reserved between the second supporting vertical wall 2012 and the outer frame body 23. An edge of the back shell can be bent and inserted into the reserved gap, as shown in FIG. 2.

The structure provided in embodiments of the present disclosure can be used to alleviate the impact force on the light filtering strip 1 when the transparent cover plate 100 tilts, and to reduce the risk of the light filtering strip 1 jumping out of the frame assembly 200. When the first insertion part 121 is inserted into or embedded in the first mounting chamber 211*d*, the first mounting chamber 211*d* can restrict the position of the first insertion part 121. Further, the first mounting chamber 211*d* can support the first insertion part 121 when the light filtering strip 1 is subjected to the impact, and the second mounting chamber 221 can support the second insertion part 114 when the light filtering strip 1 is subjected to the impact, which allows the light filtering strip 1 to withstand an impact force greater than the original structure, thereby reducing the coverage area of the first supporting vertical wall 2011 and reducing the manufacturing cost of the display device. For example, the coverage area of the first supporting vertical wall 2011 is reduced by 70% to 80% compared to the coverage area of the connecting strip in the related art. At the same time, the frame assembly can still prevent the jumping off of the light filtering strip 1.

In some embodiments, referring to FIG. 9, a third gap is formed between the first supporting vertical wall 2011, the outer side surface of the transparent cover plate 100, and the first mounting chamber 211*d*, and the water bar 122 is located within the third gap.

In some embodiments, there is a gap between the outer side surface of the transparent cover plate 100 and the first mounting chamber 211*d*, and due to the fact that the supporting member 201 is connected to the transparent cover plate 100 through the bumper block, there is also a gap between the transparent cover plate 100 and the supporting member 201. Therefore, the third gap is formed between the outer side surface of the transparent cover plate 100, the first mounting chamber 211*d*, and the supporting member 201, which can be understood as a space enclosed by the outer side surface of the transparent cover plate 100, the first mounting chamber 211*d*, and the supporting member 201. The water bar 122 can be located in the third gap to block the first mounting chamber 211*d* and to guide the water to flow towards the supporting member 201, so that the water can flow out of the display device, and the waterproof function can be achieved.

In some embodiments, referring to FIG. 9, there is a gap between the water bar 122 and the outer side surface of the transparent cover plate 100, as well as a gap between the water bar 122 and the supporting member 201.

In some embodiments, a fourth gap is formed between the inner side surface of the rear frame wall 21 and the outer side surface of the supporting transverse wall 2013, and a fifth gap is formed between the rear side surface of the rear frame wall 21 and the front side surface of the second supporting vertical wall 2012. The slope of the water bar 122 can guide the water entering the frame assembly 200 to the fourth gap, and then flow out of the frame assembly 200 through the fifth gap.

In some embodiments, in the display device, there is inevitably a gap between the light filtering strip 1 and the light emitting surface of the transparent cover plate 100 due to the design. According to the present disclosure, a gap can be formed between the water bar 122 and the outer side surface of the transparent cover plate 100. In this way, the water flowing in from the gap between the light filtering strip 1 and the light emitting surface of the transparent cover plate 100 can flow to the water bar 122, and then flow along the water bar 122 into the gap between the water bar 122 and the supporting member 201. Due to the fact that there is a small gap between the supporting member 201 and the frame assembly 200, the water flowing in from the water bar 122 can gradually be guided out of the display device along the gap.

In some embodiments, the first mounting chamber 211*d* can have a water storage tank 211*e* or not have a water storage tank 211*e*. The gap between a side surface of the supporting member 201 close to the frame assembly 200 and the frame assembly 200 can allow the water flowing into the frame assembly 200 to be guided out of the frame assembly 200 through the gap. In the case where the water storage tank 211*e* is provided, there may be a gap or no gap between the side surface of the supporting member 201 close to the frame assembly 200 and the frame assembly 200, and the water flowing into the frame assembly 200 can be guided into the water storage tank 211*e*, to avoid the water overflowing into the wiring cavity 3, which may affect the performance of the infrared touch assembly 4.

Figure 10:
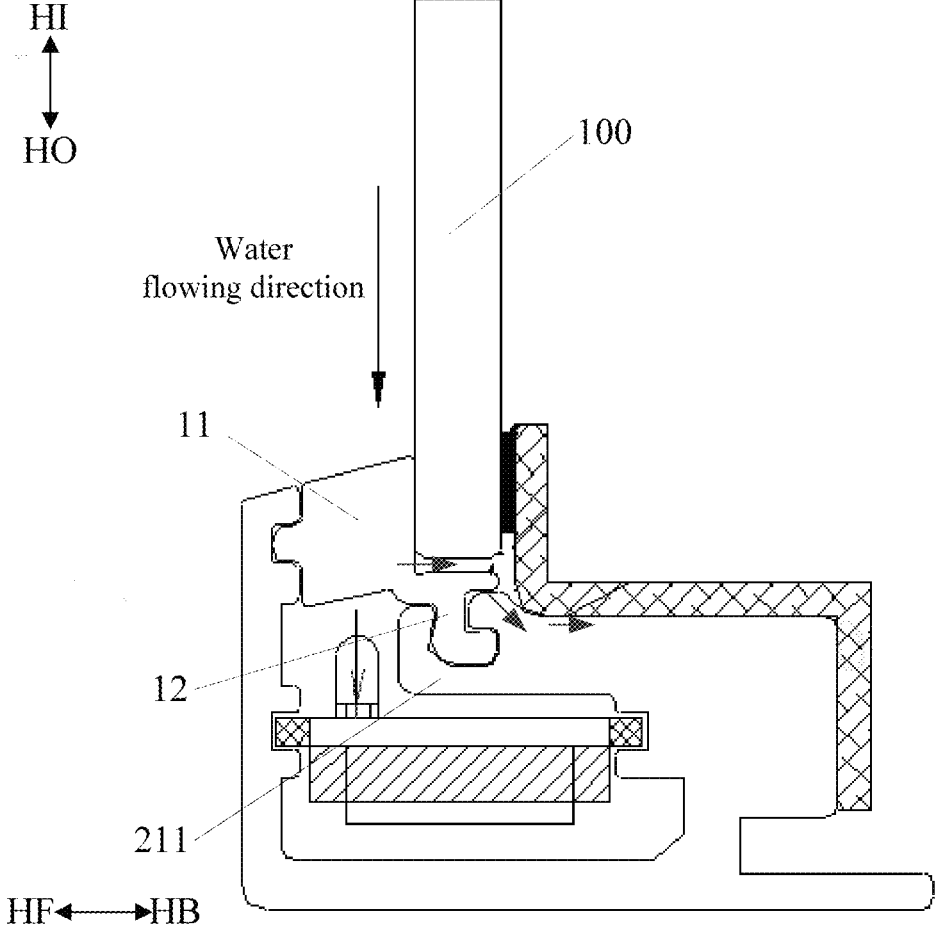

In some embodiments, referring to FIG. 10, which shows a schematic diagram of the flow direction of water in the display device provided by the present disclosure. As shown in FIG. 10, the direction of the arrow shows the flow direction of the water entering the display device of the present disclosure. The water flows from the gap between the light emitting surface of the transparent cover plate 100 and the light filtering strip 1 into the gap between the outer side surface of the transparent cover plate 100 and the water bar 122, and is blocked by the water bar 122 of the light filtering strip 1 to change the flow direction. The water flows along the water bar 122, gradually flows to the gap between the supporting member 201 and the frame assembly 200, and flows along the extension direction of the gap between the supporting member 201 and the frame assembly 200 until it flows out of the frame assembly 200.

When a large amount of water enters the display device, the first mounting chamber 211*d* can be provided with a water storage tank 211*e* to store the water that has not flowed out of the frame assembly 200. In this case, referring to FIG. 11, which shows a schematic diagram of the flow direction of the water in the display device provided by the present disclosure. As shown in FIG. 11, the water also flows, along the gap between the light emitting surface of the transparent cover plate 100 and the light filtering strip 1, into the gap between the outer side surface of the transparent cover plate 100 and the water bar 122. Due to the blocking by the water bar 122, the water flows along the water bar 122 to the gap between the supporting member 201 and the frame assembly

200. Further, due to the large amount of water, some of the water may enter the first mounting chamber 211*d* along the gap between the water bar 122 and the frame assembly 200, and then flow into the water storage tank 211*e* along the wall of the first mounting chamber 211*d*, thereby preventing the water from entering the cavity surrounded by the frame assembly 200 and the light filtering strip 1 from the water storage tank 211*e*, causing damage to the infrared touch assembly 4 accommodated in the cavity. In some embodiments, due to the communication between the water storage tank 211*e* and the first mounting chamber 211*d*, and due to the fact that the first mounting chamber 211*d* has a first opening 211*a* that is communicated with the outside, the water accumulated in the water storage tank 211*e* can evaporate and leave, avoiding the continuous accumulation of the water in the water storage tank 211*e*.

According to the display device provided in embodiments of the present disclosure, the first mounting chamber 211*d* is provided in the frame assembly 200, and the opening direction of the first opening 211*a* of the first mounting chamber 211*d* is made to be parallel to the opening direction of the second opening 31 of the wiring cavity 3, so that the first insertion part 121 of the light filtering strip 1 needs to be inserted into the first mounting chamber 211*d* at the side edge of the display screen, thereby reducing the touch height of the display device by refracting by the light filtering strip 1 the light emitted by the infrared touch assembly 4 at the side edge of the display screen to be parallel to the display screen. Meanwhile, due to the fact that the light filtering strip 1 further includes a water bar 122 that covers the first gap 231 between the second wall 211*c* of the first mounting chamber 211*d* and the first insertion part 121, the water bar 122 can be used together with the water storage tank 211*e* in the first mounting chamber 211*d* to prevent external water from flowing into the wiring cavity 3 of the frame assembly 200 that accommodates the infrared touch assembly 4, thereby improving the waterproof performance of the frame assembly 200. In addition, due to the fact that the size of at least a portion of the space inside the first mounting chamber 211*d* is larger than the size of the first opening 211*a*, and the size of one end of the first insertion part 121 away from the light filtering strip 1 is larger than the size of the other end of the first insertion part 121 close to the light filtering strip 1, the first insertion part 121 can be restricted within the first mounting chamber 211*d*, preventing the light filtering strip 1 from jumping out of the frame assembly 200 when subjected to the impact, and improving the stability of the light filtering strip 1.

In the tilting experiment of the entire machine using the display device, the external force is applied to the transparent cover plate 100 to cause the display device to tilt. The light filtering strip 1 is subjected to the impact force from the transparent cover plate 100, a force point B exists in the first insertion part 121, and a force point A exists in the second insertion part 114, as shown in FIG. 9. The force point A can provide support for the light filtering strip 1, while the force point B acts as a buffer to reduce the impact force exerted on the light filtering strip 1. Moreover, due to the fact that the size of one end of the first insertion part 121 away from the light filtering strip 1 is larger than the size of the other end of the first insertion part 121 close to the light filtering strip 1, and due to the fact that the size of at least a portion of the space inside the first mounting chamber 211*d* in the direction orthogonal to the light output direction of the light filtering strip 1 is larger than the size of the first opening 211*a* in that direction, the first mounting chamber 211*d* can restrict the position of the light filtering strip 1, thereby preventing the light filtering strip 1 from jumping out of the frame assembly 200, allowing the display device to withstand greater impact force while the light filtering strip 1 does not jump off.

Moreover, by using this structure, the performance requirements for the supporting member 201 in the display device are reduced, and the adhesive performance requirements between the transparent cover plate 100 and the supporting member 201 are reduced, resulting in a 70% to 80% reduction in the area of the supporting member 201. The silicone block or foam can be used to connect the supporting member 201 and the transparent cover plate 100, reducing the preparation cost of the optical touch device.

When the external water flows into the display device, the water enters the frame assembly 200 through the gap between the light filtering strip 1 and the transparent cover plate 100, blocked by the water bar 122 of the light filtering strip 1, and flows along the extension direction of the water bar 122. As the water bar 122 extends towards the supporting member 201, the water flowing along the extension direction of the water bar 122 is guided to the gap between the frame assembly 200 and the supporting member 201, and flows along the gap until it flows out of the frame assembly 200. Therefore, the display device has waterproof function, which can prevent the water from entering the infrared touch assembly 4 located in the space surrounded by the light filtering strip 1 and the frame assembly 200.

In some embodiments, when a large amount of water enters the display device, there may be some water accumulation in the gap between the frame assembly 200 and the supporting member 201, causing excess water to flow into the first mounting chamber 211*d* along the gap between the water bar 122 and the frame assembly 200. The water flowing into the gap between the supporting member 201 and the frame assembly 200, partially flows along this gap and is guided to the outside of the display device, while some of the water entering the first mounting chamber 211*d* flows along the wall of the first mounting chamber 211*d* and accumulates in the water storage tank 211*e*. Since the water storage tank 211*e* is communicated with the first mounting chamber 211*d*, and the first mounting chamber 211*d* is communicated with the outside, the water accumulated in the water storage tank 211*e* can evaporate and can be removed, further improving the waterproof performance of the display device.

According to the display device of the present disclosure, light rays with larger angles can enter a side of the first insertion part 121 close to the light filtering strip 1 and exit parallel to the transparent cover plate 100, allowing the light rays to propagate to the infrared receiver located on the opposite side. Similarly, light rays with lower heights incident from the opposite side can be refracted by the light filtering strip 1, allowing the light rays to propagate to the infrared touch assembly 4. As a result, the effective emission angle and effective reception angle of the light both increase, thereby reducing the touch height of the display device.

In some embodiments of the present disclosure, as shown in FIGS. 12 to 15, a sealing groove is provided on the rear side surface of the light filtering part 11, and a sealing element GG is provided inside the sealing groove. The interference fit is used between the sealing element and the transparent cover plate. In this way, by using the interference fit between the sealing element GG and the transparent cover plate 100, there will be no gap between the transparent cover plate 100 and the sealing element GG due to looseness or aging. The possible gap will be filled through volume recovery from the sealing element GG. Such arrangement can prevent moisture from flowing into the interior of the display device along a gap between the sealing element GG and the transparent cover plate 100, thereby avoiding the potential harm of the moisture to electronics inside the display device.

In some embodiments, the sealing groove is filled with the sealing element. Furthermore, a width of the sealing groove is not smaller than 0.5 times a width of the contact surface between the light filtering part and the transparent cover plate. In this way, the waterproof effect can be improved by increasing the width of the contact surface between the sealing element and the transparent cover plate as much as possible.

In some embodiments, a depth of the sealing groove is not smaller than 0.2 millimeters. In this way, the sealing element filled in the sealing groove can have a larger thickness by increasing the thickness of the sealing groove, which in turn makes the sealing element have greater volume recovery ability, and a maximum gap that can be eliminated by the sealing element will be larger, thereby improving the waterproof effect and the reliability of the sealing element.

In some embodiments, the sealing groove is provided away from the outer frame body. In this way, a depth of an opening facing the outside environment in the contact area between the light filtering part 11 and the transparent cover plate 100 can be as small as possible, thereby avoiding residual moisture in a gap possibly formed at the opening and accumulated solid objects in the gap possibly formed at the opening, reducing the aging rate of the light filtering part 11, and avoiding the gap possibly formed between the light filtering part 11 and the transparent cover plate 100 being persistently maintained. In addition, it is beneficial for improving the waterproof effect and the reliability.

In some embodiments, a compression amount of the sealing element is between 40% and 60%. In this way, the sealing element will have good volume recovery ability, so that possible gaps can be filled effectively by restoring volume and the waterproof effect can be achieved. In some embodiments, the compression amount of the sealing element refers to a ratio of a thickness reduction value (a thickness without compression—a thickness in use) of the sealing element in use to a thickness of the sealing element without being used.

In some embodiments, a friction coefficient between the sealing element and the transparent cover plate ranges from 1.0 to 3.5. In this way, the bonding strength between the sealing element GG and the transparent cover plate 100 can be improved, thereby improving the waterproof effect.

In some embodiments, a surface roughness of the sealing element close to the transparent cover plate is within a range of 4-12 microns. In this way, the sealing element GG can have good hydrophobic ability, thereby improving the waterproof effect.

In some embodiments, the sealing element can also be prepared or surface modified by using hydrophobic materials, which enables the sealing element to be hydrophobic, thereby improving the waterproof effect of the sealing element.

In some embodiments, the sealing element is a silicone strip. Furthermore, the silicone strip can be a prefabricated silicone strip that can be adhered into the sealing groove by using the adhesive (such as double-sided adhesive). In some embodiments, the sealing element can also be a prefabricated strip part that is prepared from other materials.

In some embodiments, the sealing groove is provided on the rear side surface of the light filtering part, and the sealing groove is filled with sealant. The transparent cover plate and the light filtering part are sealed and connected through the sealant. It is possible to fill the sealing groove with a certain amount of elastic sealant by adding (such as dripping) the sealant in the sealing groove. The sealant is constrained by a shape of the sealing groove and serves as a sealing element.

According to embodiments of the present disclosure, the sealing element is provided between the light filtering part 11 and the transparent cover plate 100, so as to improve the waterproof effect, which can be applied in different types of light filtering parts and different types of frame assemblies.

Figure 12:
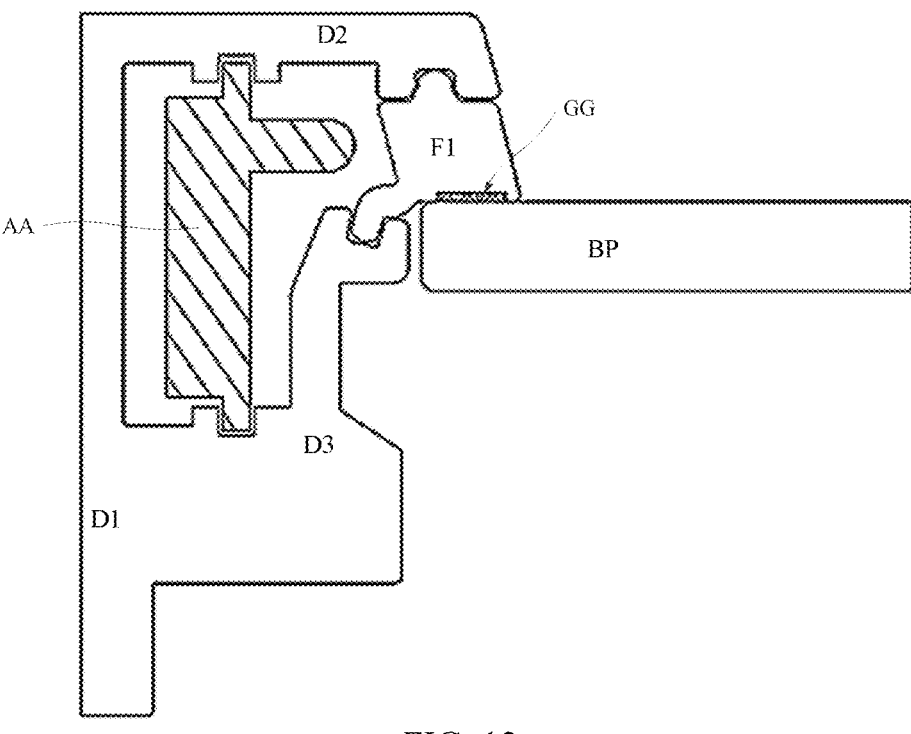

For example, in embodiments shown in FIG. 12, the front frame wall can form the securing groove, and the light filtering part 11 forms the securing protrusion that matches with the securing groove. Such arrangement can also effectively improve the fit and the fix between the light filtering part 11 and the front frame wall.

Figure 13:
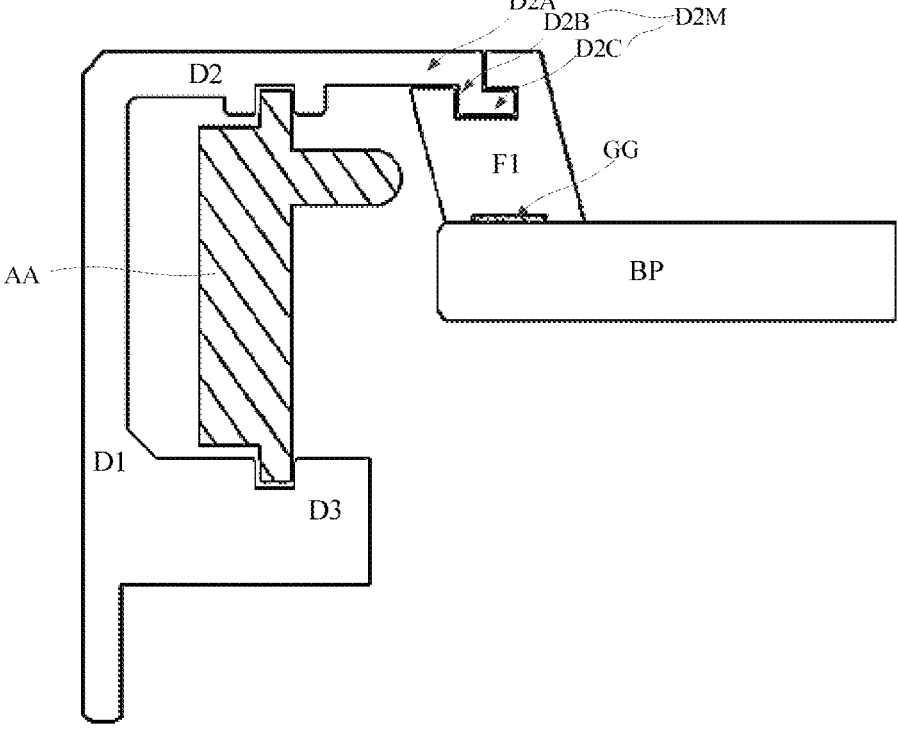

For example, in embodiments shown in FIG. 13, an end of the front frame wall 22 can form a bent fastening part D2M, and the light filtering part 11 can form a fastening chamber that matches with the fastening part. The fastening part D2M can be inserted into the fastening chamber, thereby effectively improve the fit and the connection between the light filtering part 11 and the front frame wall. Furthermore, the fastening part D2M of the front frame wall 22 can include a connecting protrusion D2B extending towards a side of the transparent cover plate 100, and a positioning protrusion D2C connected to the connecting protrusion D2B and parallel to the transparent cover plate 100. The connecting protrusion D2B is perpendicular to the transparent cover plate 100, and the positioning protrusion D2C is connected to an end of the connecting protrusion D2B close to the transparent cover plate 100 and extends towards a direction away from the infrared touch assembly 4. Correspondingly, the fastening chamber includes an avoidance gap, a connecting groove, and a positioning groove. A shape of the positioning groove matches with a shape of the positioning protrusion D2C to accommodate the positioning protrusion D2C. A shape of the connecting groove matches with a shape of the connecting protrusion D2B to accommodate the connecting protrusion D2B. The avoidance gap is connected with the connecting groove to accommodate a portion D2A of the front frame wall 22 close to the connecting protrusion. In this way, by providing the positioning groove and the connecting groove, the fastening part of the front frame wall 22 can be fixedly connected to the fastening chamber of the light filtering part 11, especially by inserting the positioning protrusion D2C of the front frame wall 22 into the positioning groove of the light filtering part 11. The light filtering part 11 can accommodate the end of the front frame wall 22 by providing the avoidance gap, avoiding the front frame wall 22 from excessively protruding in front of the light filtering part 11. In some embodiments, a thickness of the avoidance gap of the light filtering part 11 is the same as a thickness of a portion of the front frame wall 22 close to the fastening part, which allows the portion D2A of the front frame wall 22 close to the connecting protrusion to be fully accommodated in the avoidance gap. On the one hand, the front side surface of the front frame wall 22 can be flush with the front side surface of the light filtering part 11, and on the other hand, an inner side end of the front frame wall 22 can be completely wrapped by the light filtering part 11.

For example, in embodiments shown in FIG. 13, the light filtering part 11 can be not provided with the buffer part, and the rear frame wall can be not provided with the resisting part either. The display device can fix the transparent cover plate 100 through other means to ensure that the transparent cover plate 100 does not slip.

Figure 14:
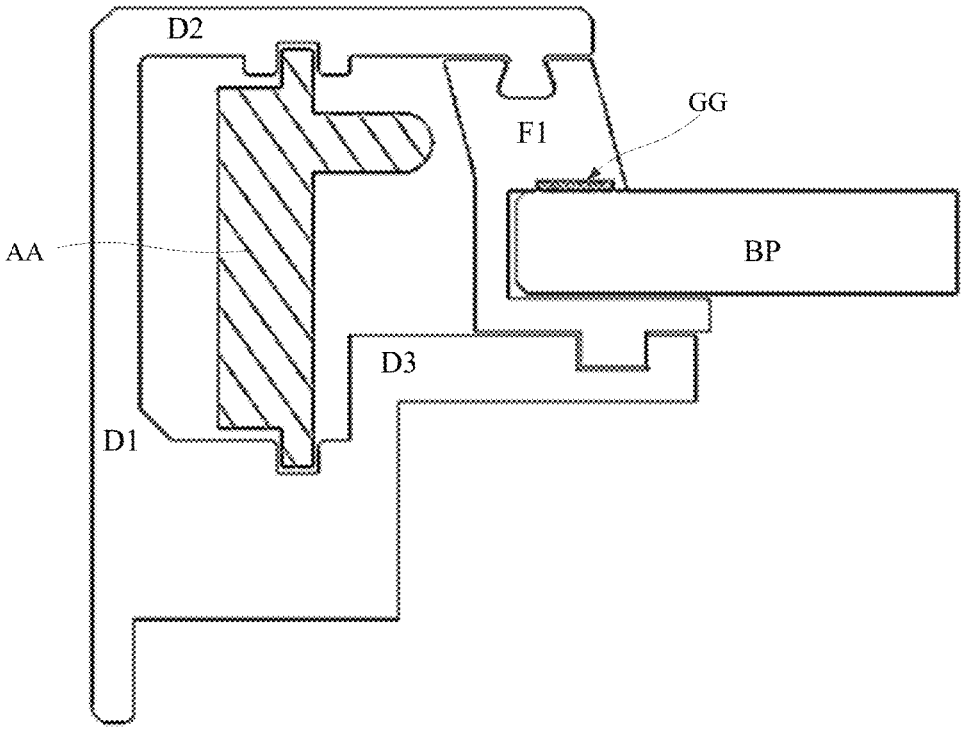

For example, in embodiments shown in FIG. 14, one end of the light filtering strip close to the frame assembly 200 can be provided with a wrapping part connected to the light filtering part 11, and the wrapping part can wrap the side surface and the rear side edge of the transparent cover plate 100. The rear frame wall can have a supporting part, and the supporting part and the rear side surface of the transparent cover plate 100 are connected and buffered through the wrapping part. In some embodiments, a portion of the wrapping part located on the rear side surface of the transparent cover plate 100 has a fixed protrusion, and the supporting part of the rear frame wall has a fixed groove that matches with the fixed protrusion. In this way, the wrapping part can be prevented from side slipping, thereby improving the fixing effect on the transparent cover plate 100.

Figure 15:
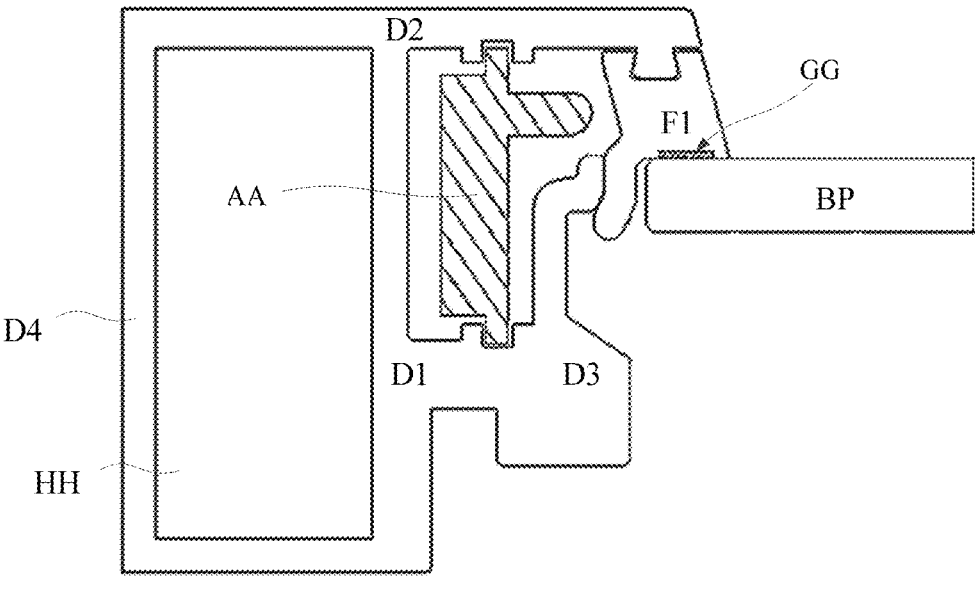

For example, in embodiments shown in FIG. 15, the frame assembly 200 can also be provided with a reinforcing part D4, the reinforcing part D4 is located on the outer side of the outer frame body 23 and has a weight reducing cavity HH between it and the outer frame body 23. In this way, the strength of the frame assembly 200 can be improved. In some embodiments, electronics can also be arranged in the weight reducing cavity HH, such as a driving circuit for driving the display panel. In the present disclosure, a material of the transparent cover plate 100 can be inorganic or organic. For example, in some embodiments of the present disclosure, the material of the transparent cover plate 100 can be soda-lime glass, quartz glass, sapphire glass, and other glass materials. For example, in some embodiments of the present disclosure, the material of the transparent cover plate 100 can be polymethyl methacrylate (PMMA), polyvinyl alcohol (PVA), polyvinyl phenol (PVP), polycarbonate (PC), polyethylene terephthalate (PET), polyethylene naphthalate (PEN), and other transparent organic materials.

In some embodiments, the transparent cover plate 100 is a tempered glass cover plate.

In some embodiments of the present disclosure, the materials of the outer frame 2 and supporting member 201 can be metallic materials, such as alloy materials, so as to enhance the strength of the outer frame 2 and the supporting member 201. It can be understood that the materials of the outer frame 2 and the supporting member 201 can be the same or different. In some embodiments, the materials of the outer frame 2 and the supporting member 201 are aluminum alloy.

In the present disclosure, the display panel PNL can be an OLED (Organic Light-Emitting Diode) display panel, a Micro LED (Micro Light-Emitting Diode) display panel, a QD-OLED (Quantum Dot Light-Emitting Diode) display panel, an LCD display panel (liquid crystal display panel), an EPD display panel (electrophoresis display panel) or other feasible display panels, which can display the image, and are not limited in the present disclosure. For example, in some embodiments of the present disclosure, the display panel is an LCD display panel, which includes a display module and a backlight module stacked arranged, and the backlight module is located behind the display module.

After considering the specification and practicing of the invention disclosed herein, those skilled in the art will easily come up with other implementation solutions of the present disclosure. The present disclosure aims to cover any variations, uses, or adaptive changes of the present disclosure, which follow the general principles of the present disclosure and include common knowledge or commonly used technical means in the art that are not disclosed in the present disclosure. The specification and embodiments are only considered exemplary, and the true scope and spirit of the present disclosure are defined by appended claims.

What is claimed is:

1. A display device, comprising a transparent cover plate and a frame assembly, wherein the frame assembly comprises an outer frame and a light filtering strip;

the light filtering strip comprises a light filtering part and a buffer part, wherein the light filtering part presses at a front side edge of the transparent cover plate;

the outer frame comprises a front frame wall and a rear frame wall, wherein an inner side end of the front frame wall presses on a front side surface of the light filtering part; and the rear frame wall comprises a resisting part that resists against an outer side of the buffer part, wherein the buffer part is located between the resisting part and an outer side surface of transparent cover plate.

2. The display device according to claim 1, further comprising:

an infrared touch assembly, wherein the infrared touch assembly is accommodated in a wiring cavity formed inside the frame assembly, and the wiring cavity comprises a second opening configured for the infrared touch assembly to emit or receive touch light signals.

3. The display device according to claim 2, wherein the buffer part comprises a first insertion part, the resisting part comprises a first mounting chamber, the first mounting chamber comprises a first opening on a side of the first mounting chamber facing towards the buffer part, and the first insertion part is embedded in the first mounting chamber via the first opening; and wherein an opening direction of the first opening is the same as an opening direction of the second opening.

4. The display device according to claim 3, wherein the first mounting chamber comprises:

a first wall; and a second wall located on a side of the first wall away from the second opening, wherein a first gap is formed between the second wall and the first insertion part; and wherein the buffer part further comprises a water bar, and the water bar covers the first gap.

5. The display device according to claim 4, wherein the water bar comprises, on a side of the water bar away from the second opening, a slope inclined towards a direction where the first opening is located.

6. The display device according to claim 3, wherein the resisting part further comprises a water storage tank, and the water storage tank is communicated with the first mounting chamber.

7. The display device according to claim 6, wherein the water storage tank is provided in at least one of following forms: the water storage tank is located on a side of the first mounting chamber away from the first opening, or the water storage tank is located on a side of the first mounting chamber away from the second opening.

8. The display device according to claim 3, wherein a size of at least a portion of an internal space of the first mounting chamber in a target direction is larger than a size of the first opening in the target direction, and the target direction is orthogonal to the opening direction of the first opening.

9. The display device according to claim 3, wherein the frame assembly further comprises:

a second mounting chamber, wherein the first mounting chamber and the second mounting chamber are respectively located on opposite sides of the second opening, the second mounting chamber comprises a third opening, and an opening direction of the third opening intersects with the opening direction of the first opening; and wherein the light filtering strip further comprises a second insertion part, wherein the second insertion part is embedded in the second mounting chamber via the third opening.

10. The display device according to claim 9, wherein the light filtering part comprises a first surface, a second surface, and a third surface, the first surface is adjacent to the second surface, and the third surface is opposite to the first surface and adjacent to the second surface;

wherein the buffer part further comprises a connection part, and the first insertion part is connected to the light filtering part via the connection part; and wherein the second insertion part is connected to the first surface, and the connection part is connected to one of the second surface, the third surface, and a connection between the second surface and the third surface.

11. The display device according to claim 5, wherein the frame assembly further comprises a supporting member, the supporting member comprises a first supporting vertical wall, a supporting transverse wall, and a second supporting vertical wall, the first supporting vertical wall is connected to a front side end of the supporting transverse wall and extends towards an inner side of the transparent cover plate, the first supporting vertical wall is connected to a rear side edge of the transparent cover plate, the second supporting vertical wall is connected to a rear side end of the supporting transverse wall and extends towards an outer side of the transparent cover plate, and the second supporting vertical wall is connected to the outer frame, and wherein a third gap is formed between the first supporting vertical wall, the outer side surface of the transparent cover plate, and the first mounting chamber, and the water bar is located within the third gap.

12. The display device according to claim 11, wherein a fourth gap is formed between an inner side surface of the rear frame wall and an outer side surface of the supporting transverse wall, a fifth gap is formed between a rear side surface of the rear frame wall and a front side surface of the second supporting vertical wall, and the slope of the water bar can guide water entering the frame assembly to the fourth gap and discharge the water from the frame assembly via the fifth gap.

13. The display device according to claim 11, wherein the first supporting vertical wall is connected to the rear side edge of the transparent cover plate through double-sided adhesive, and a width of an adhesive surface between the double-sided adhesive and the transparent cover plate is 1.1-2.0 times a width of a contact surface between the light filtering part and the transparent cover plate.

14. The display device according to claim 3, wherein a portion of a chamber wall or the whole chamber wall of the first mounting chamber is coated with a water absorbing film.

15. The display device according to claim 1, wherein the buffer part comprises a bearing section and a guiding section, a width of the bearing section is not smaller than half of a thickness of the transparent cover plate, and the guiding section is connected to a rear side end of the bearing section and tilts towards the outer side of the buffer part.

16. The display device according to claim 15, wherein the bearing section resists against the resisting part on all outer side surface of the bearing section.

17. The display device according to claim 15, wherein an angle between the guiding section and a side surface of the transparent cover plate ranges between 5° and 30°.

18. The display device according to claim 15, wherein a size of the buffer part in a front-rear direction is 0.9-1.3 times a thickness of the transparent cover plate.

19. The display device according to claim 1, wherein the front frame wall is provided with a securing protrusion protruding towards a rear side of the front frame wall, and a thickness of a rear side end of the securing protrusion is larger than a thickness of a front side end of the securing protrusion; and wherein the front side surface of the light filtering part is provided with a securing groove that matches with the securing protrusion, and the securing protrusion is inserted into the securing groove.

20. The display device according to claim 1, wherein a body portion of the rear frame wall is provided on a rear side of the transparent cover plate.

21. The display device according to claim 1, wherein the buffer part comprises a limit protrusion, and the resisting part resists against a rear side surface of the limit protrusion.

22. The display device according to claim 1, wherein the frame assembly further comprises a supporting member, and the supporting member is connected to the outer frame and bonded to a rear side edge of the transparent cover plate.

* * * * *